United States Patent
Gutierrez Barragan et al.

(10) Patent No.: US 10,739,447 B2
(45) Date of Patent: Aug. 11, 2020

(54) SYSTEMS, METHODS, AND MEDIA FOR ENCODING AND DECODING SIGNALS USED IN TIME OF FLIGHT IMAGING

(71) Applicants: Wisconsin Alumni Research Foundation, Madison, WI (US); The Trustees of Columbia University in the City of New York, New York, NY (US)

(72) Inventors: Felipe Gutierrez Barragan, Madison, WI (US); Mohit Gupta, Madison, WI (US); Andreas Velten, Madison, WI (US); Eric Breitbach, Madison, WI (US); Shree K. Nayar, New York, NY (US)

(73) Assignees: Wisconsin Alumni Research Foundation, Madison, WI (US); The Trustees of Columbia University in the City of New York, New York, NY (US)

(*) Notice: Subject to any disclaimer, the term of this patent is extended or adjusted under 35 U.S.C. 154(b) by 145 days.

(21) Appl. No.: 15/699,623

(22) Filed: Sep. 8, 2017

(65) Prior Publication Data

US 2019/0146073 A1    May 16, 2019

Related U.S. Application Data

(63) Continuation-in-part of application No. 15/492,969, filed on Apr. 20, 2017.

(51) Int. Cl.
*G01S 7/4911* (2020.01)
*G06T 7/521* (2017.01)
(Continued)

(52) U.S. Cl.
CPC ............ *G01S 7/4911* (2013.01); *G01S 7/484* (2013.01); *G01S 7/4865* (2013.01);
(Continued)

(58) Field of Classification Search
CPC combination set(s) only.
See application file for complete search history.

(56) References Cited

U.S. PATENT DOCUMENTS 6,057,909 A * 5/2000 Yahav .................. G01C 11/025
                                                  313/103 CM
9,921,311 B2    3/2018 Van Der Tempel
(Continued)

OTHER PUBLICATIONS

Adam, A., et al., 2016. Bayesian time-of-flight for realtime shape, illumination and albedo. IEEE PAMI 38.
(Continued)

*Primary Examiner* — Maria E Vazquez Colon
(74) *Attorney, Agent, or Firm* — Quarles & Brady LLP

(57) ABSTRACT

In accordance with some embodiments, systems, methods and media for encoding and decoding signals used in time-of-flight imaging are provided. In some embodiments, a method for estimating the depth of a scene is provided, comprising: causing a light source to emit modulated light toward the scene based on a modulation function; causing the image sensor to generate a first value based on the modulated light and a first demodulation function of K modulation functions; causing the image sensor to generate a second value; causing the image sensor to generate a third value; and determining a depth estimate for the portion of the scene based on the first value, the second value, the third value, and three correlation functions each including at least one half of a trapezoid wave.

21 Claims, 25 Drawing Sheets

(51) Int. Cl.
*H04N 5/225* (2006.01)
*G01S 17/89* (2020.01)
*G01S 17/32* (2020.01)
*G01S 7/4915* (2020.01)
*G01S 7/4865* (2020.01)
*G01S 17/10* (2020.01)
*G01S 7/484* (2006.01)
*H04N 5/232* (2006.01)
*G01S 17/36* (2006.01)

(52) U.S. Cl.
CPC ............ *G01S 7/4915* (2013.01); *G01S 17/10* (2013.01); *G01S 17/32* (2013.01); *G01S 17/89* (2013.01); *G06T 7/521* (2017.01); *H04N 5/2256* (2013.01); *H04N 5/232* (2013.01); *G01S 17/36* (2013.01); *G06T 2207/10028* (2013.01); *G06T 2207/10152* (2013.01)

(56) References Cited

U.S. PATENT DOCUMENTS

| 10,061,029 | B2 | 8/2018 | Waligorski |
| 2009/0322859 | A1 | 12/2009 | Shelton |
| 2015/0070684 | A1* | 3/2015 | Min ........................ G01C 3/08 356/5.01 |
| 2016/0198147 | A1* | 7/2016 | Waligorski .............. G01S 17/89 348/49 |
| 2017/0212236 | A1* | 7/2017 | Van Der Tempel .... G01S 17/10 |

OTHER PUBLICATIONS

Grootjans, R., et al., 2006. Improved modulation techniques for time-of-flight ranging cameras using pseudo random binary sequences. In Proc. IEEE LEOS Benelux Chapter.

Gupta, M., et al., 2015. Phasor Imaging: A Generalization of Correlation-Based Time971 of-Flight Imaging. ACM Trans. Graphics.

Kadambi, A., et al., 2013. Coded time of flight cameras: Sparse deconvolution to address multipath interference and recover time profiles. ACM Siggraph Asia.

O'Toole, M., et al., 2014. Temporal frequency probing for 5D transient analysis of global light transport. ACM Siggraph.

O'Toole, M., et al., 2015. Homogeneous codes for energy-efficient illumination and imaging. ACM Siggraph.

Payne, A. D., et al., 2010. Illumination waveform optimization for time-of-flight range imaging cameras. In Proc. SPIE 8085.

Schwarte, R., et al., 1997. New electro-optical mixing and correlating sensor: Facilities and applications of the photonic mixer device. In Proc. SPIE (3100).

* cited by examiner

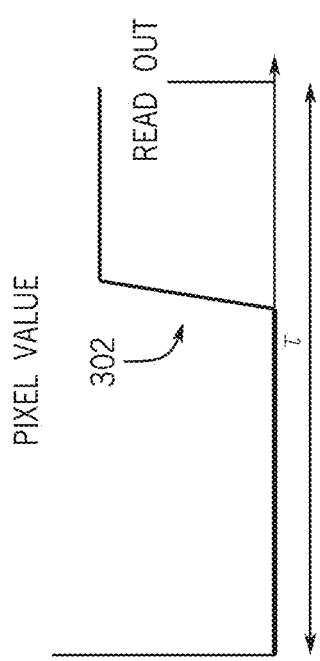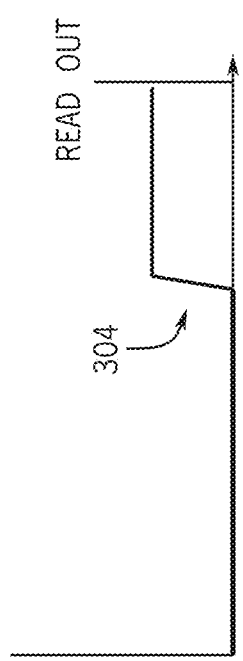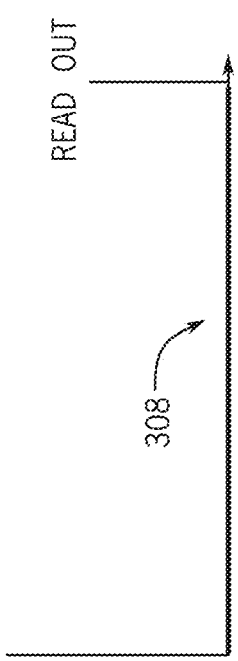

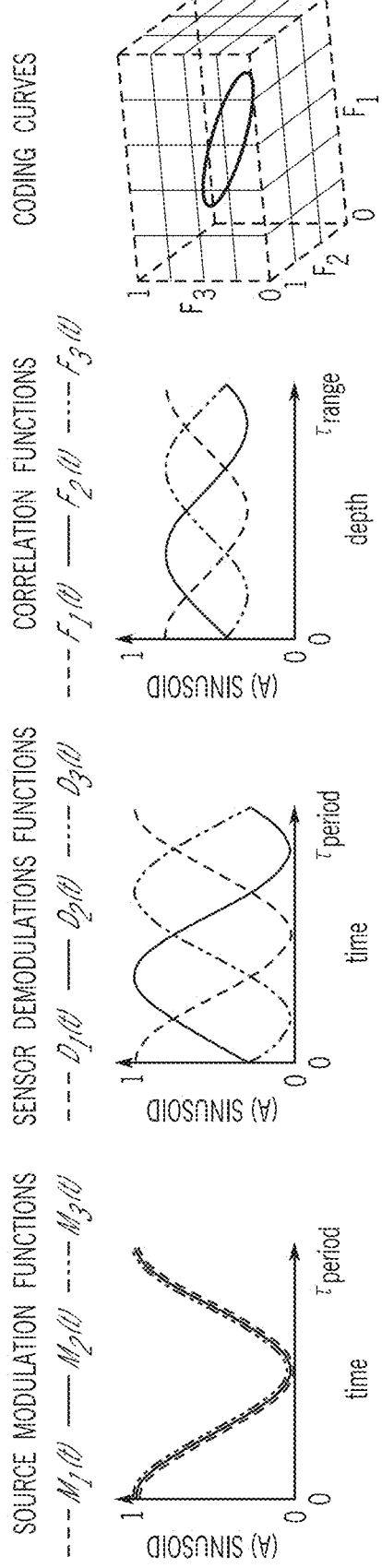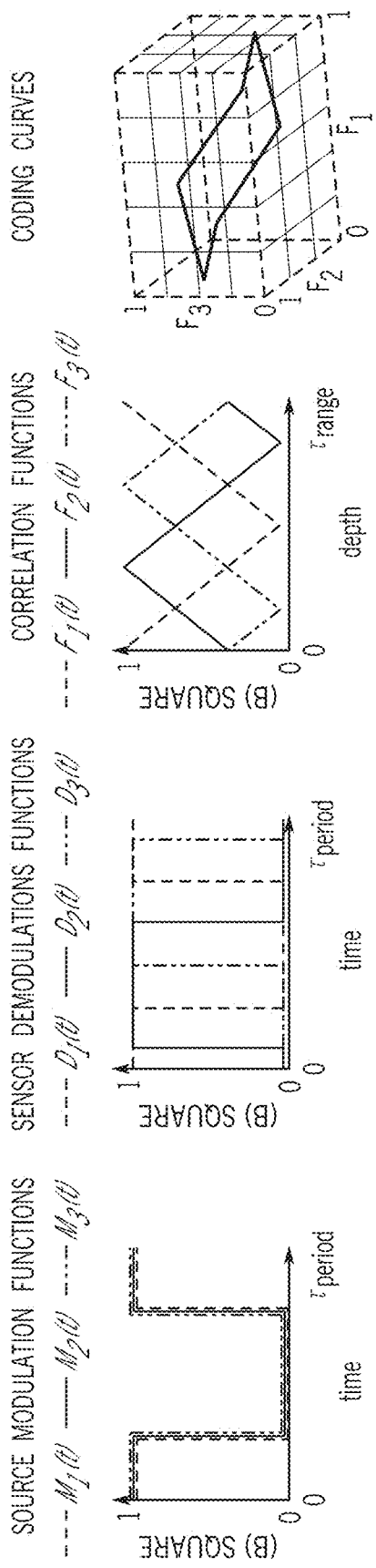

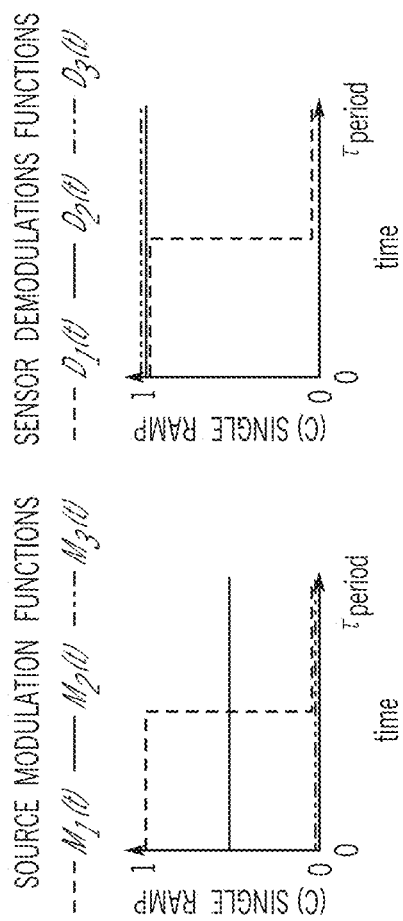
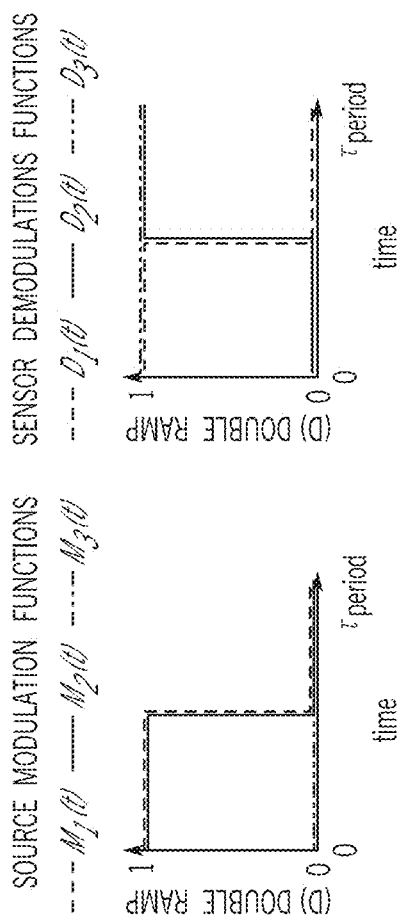
FIG. 7C1, FIG. 7C2, FIG. 7C3, FIG. 7C4, FIG. 7D1, FIG. 7D2, FIG. 7D3, FIG. 7D4

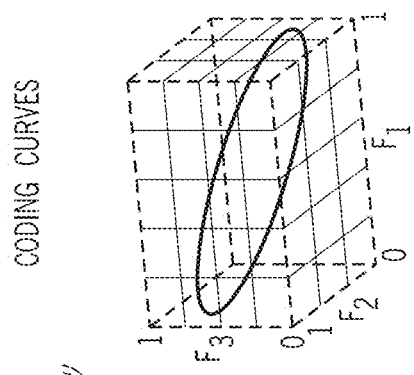
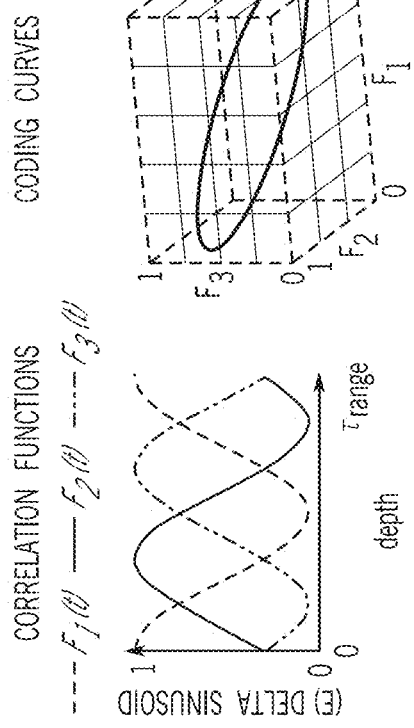
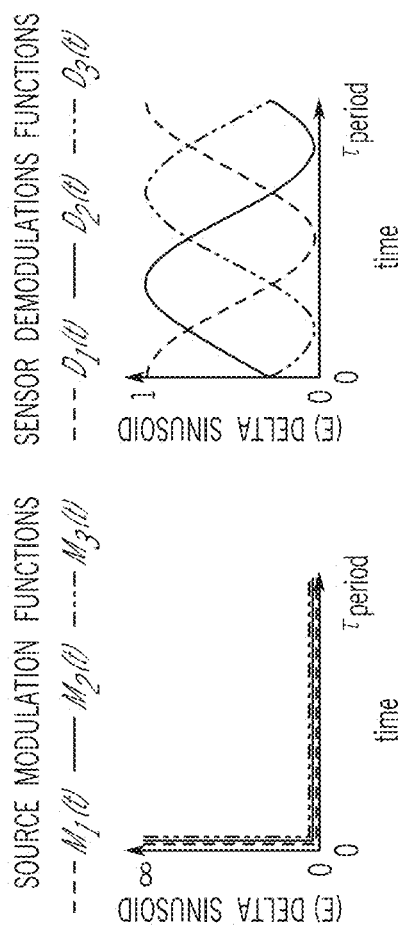
FIG. 7E1
FIG. 7E2
FIG. 7E3
FIG. 7E4
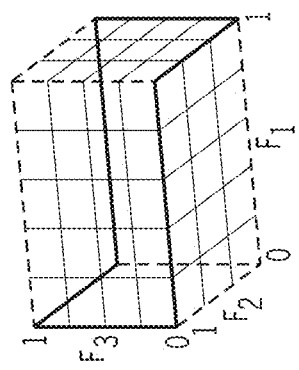
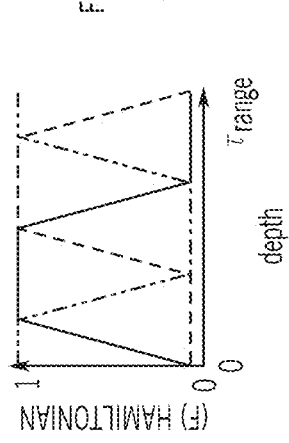
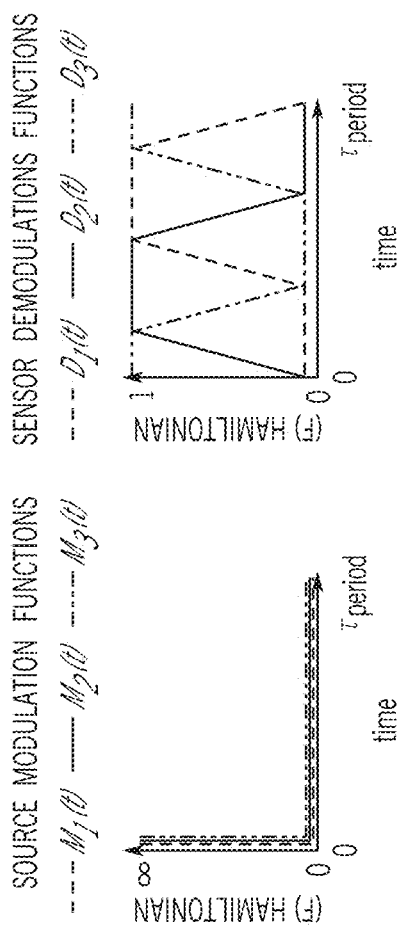
FIG. 7F1
FIG. 7F2
FIG. 7F3
FIG. 7F4

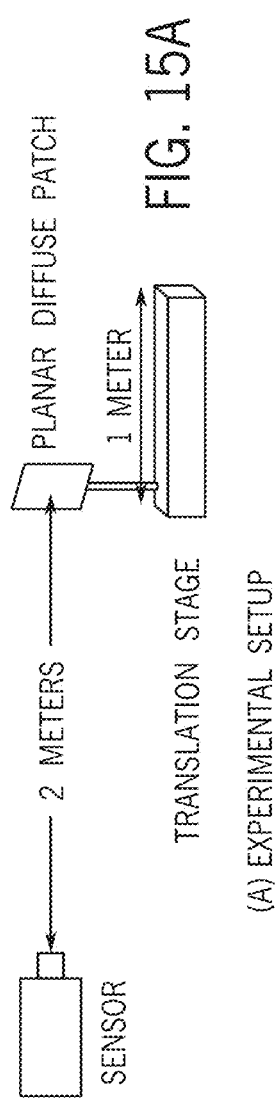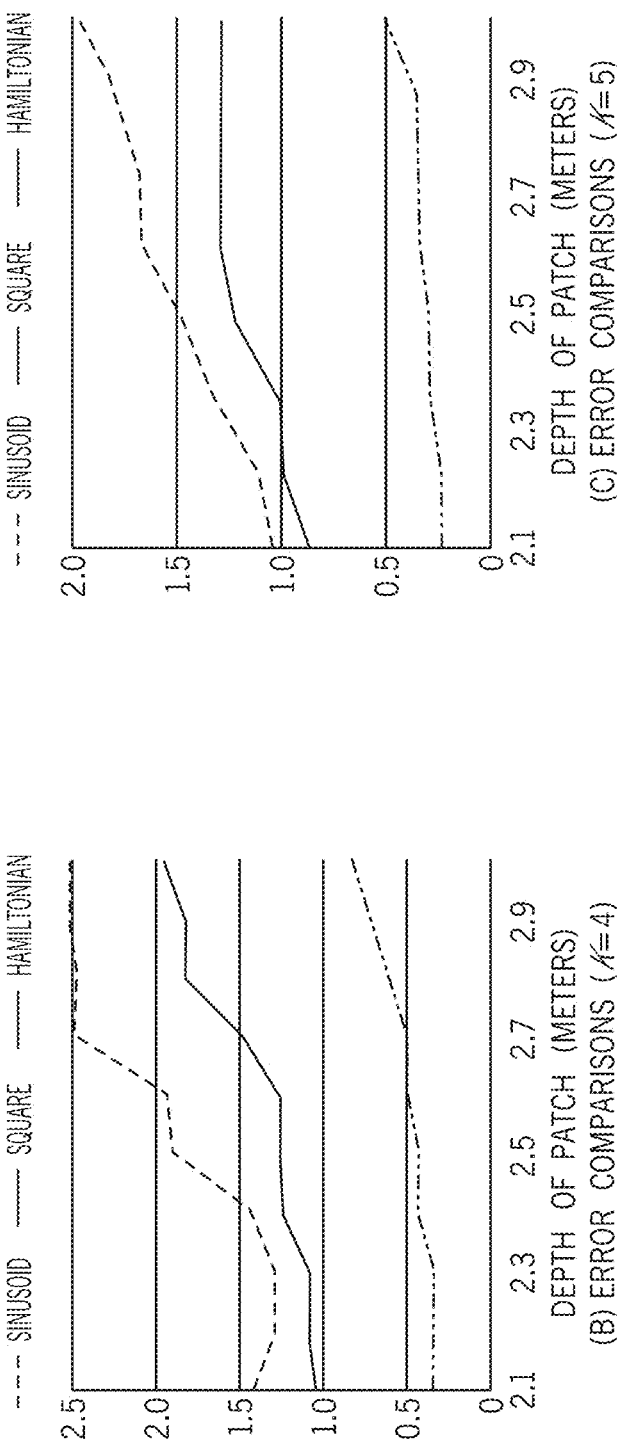

(A) ILLUSTRATION OF THE SETUP (B) IMAGE OF THE SCENE

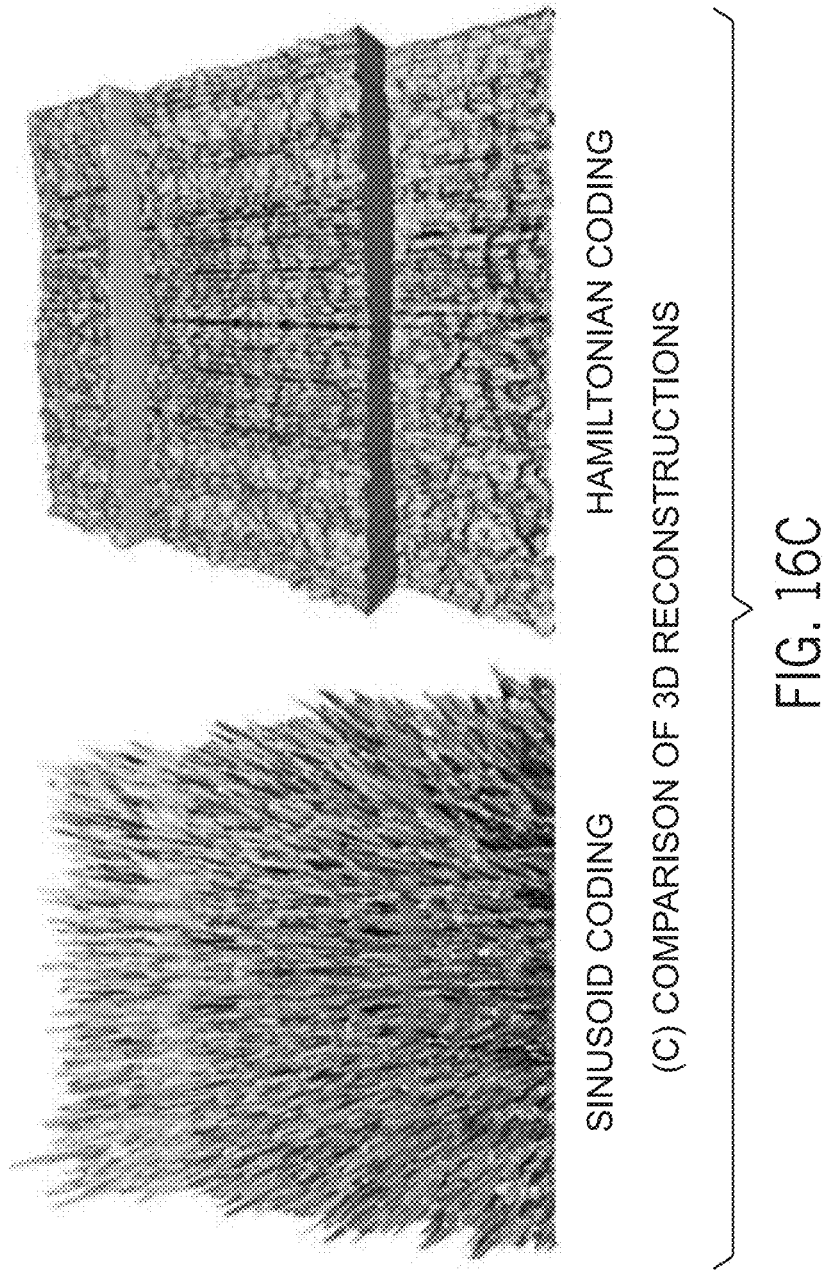

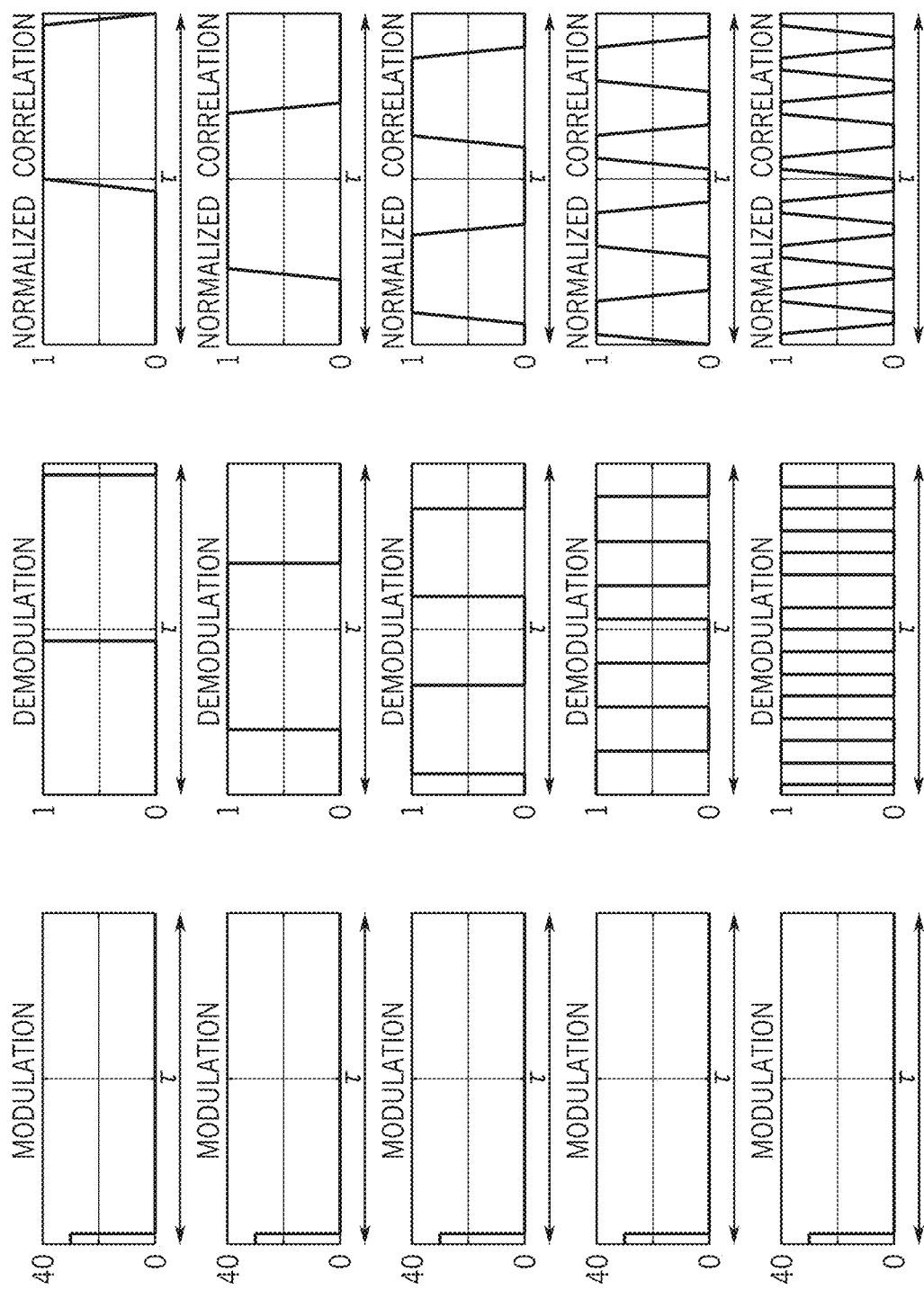

SYSTEMS, METHODS, AND MEDIA FOR ENCODING AND DECODING SIGNALS USED IN TIME OF FLIGHT IMAGING

CROSS-REFERENCE TO RELATED APPLICATIONS

This application is a continuation-in-part, under 35 U.S.C. § 120, of U.S. application Ser. No. 15/492,969, filed Apr. 20, 2017, which is hereby incorporated herein by reference in its entirety for all purposes.

STATEMENT REGARDING FEDERALLY SPONSORED RESEARCH

This invention was made with government support under N00014-16-1-2995 awarded by the NAVY/ONR and HR0011-16-C-0025 awarded by the DOD/DARPA. The government has certain rights in the invention.

BACKGROUND

In recent years, time-of-flight (ToF) cameras have emerged as a popular 3D imaging technology in several scientific and consumer applications, such as robot navigation, motion capture, human computer interfaces, and 3D mapping. Impulse ToF (sometimes referred to as direct ToF) systems estimate scene depths by emitting a short light pulse into the scene, and directly measuring the travel time of the reflected pulse. For example, impulse ToF techniques were used in LIDAR systems designed nearly 50 years ago, and several current commercial range estimation systems are based on impulse ToF techniques as well. While these systems are conceptually simple, they often require expensive components (e.g., high-speed sensors) and large bandwidth. Consequently, impulse ToF systems may not be practical for many consumer applications. Continuous-wave ToF (C-ToF) imaging systems (sometimes referred to as indirect ToF), which usually include temporally modulated light sources and image sensors, typically only require low-cost and low-power components, do not require a large baseline for measuring depth, and thus, can potentially measure accurate 3D shape over a large range of standoff distances. These properties have made C-ToF systems preferred for many low cost and/or consumer applications.

One limitation of current C-ToF camera systems, however, is limited depth resolution, especially in low signal-to-noise ratio (SNR) scenarios. Although the spatial resolution of these systems continues to rise with advances in image sensor technology, the depth resolution is fundamentally limited by noise, such as photon noise. One way to increase the SNR is to use a more powerful light source or to increase the capture time. However, this is not always possible as most devices, especially in consumer and outdoor settings, often operate on a tight power and time budget.

With the increasing popularity of these systems, efforts have been made to improve the accuracy that can be achieved with existing coding systems (e.g., sinusoid based modulation and/or demodulation). For example, techniques for mitigating depth errors in sinusoid coding based systems when the modulation functions are not perfectly sinusoid (e.g., due to the presence of higher order harmonics) have been explored. In parallel, techniques based on a few other specific modulation functions have been proposed, such as square functions, triangular functions, ramp functions, and pseudo random binary sequences. However, while these techniques and coding functions may incrementally improve the precision that can be achieved using C-ToF imaging systems, coding schemes that offer more precision are desirable.

Accordingly, new systems, methods, and media for encoding and decoding signals used in time-of-flight imaging are desirable.

SUMMARY

In accordance with some embodiments of the disclosed subject matter, systems, methods, and media for encoding and decoding signals used in time-of-flight imaging are provided.

In accordance with some embodiments of the disclosed subject matter, a system for estimating the depth of a scene is provided, the system comprising: a light source; an image sensor comprising a plurality of pixels; a signal generator configured to output at least: a first signal corresponding to a modulation function; and a second signal corresponding to a first demodulation function of K demodulation functions, wherein the second signal includes at least one trapezoid wave; and at least one hardware processor that is programmed to: cause the light source to emit modulated light toward the scene with modulation based on the first signal; cause the image sensor to generate a first value based on the modulated light received from a portion of the scene and the second signal; cause the image sensor to generate a second value based on the modulated light received from the portion of the scene and a third signal corresponding to a second demodulation function of the K demodulation functions; cause the image sensor to generate a third value based on the modulated light received from the portion of the scene and a fourth signal corresponding to a third demodulation function of the K demodulation functions; and determine a depth estimate for the portion of the scene based on the first value, the second value, and the third value.

In accordance with some embodiments of the disclosed subject matter, a method for estimating the depth of a scene is provided, the method comprising: causing a light source to emit modulated light toward the scene with modulation based on a first signal output by a signal generator, wherein the first signal corresponds to a modulation function; causing an image sensor to generate a first value based on the modulated light received from a portion of the scene and a second signal output by the signal generator, wherein the second signal corresponds to a first demodulation function of K demodulation functions, wherein the second signal includes at least one trapezoid wave; causing the image sensor to generate a second value based on the modulated light received from the portion of the scene and a third signal corresponding to a second demodulation function of the K demodulation functions; causing the image sensor to generate a third value based on the modulated light received from the portion of the scene and a fourth signal corresponding to a third demodulation function of the K demodulation functions; and determining a depth estimate for the portion of the scene based on the first value, the second value, and the third value.

In some embodiments of the disclosed subject matter, a non-transitory computer readable medium containing computer executable instructions that, when executed by a processor, cause the processor to perform a method for estimating the depth of a scene is provided, the method comprising: causing a light source to emit modulated light toward the scene with modulation based on a first signal output by a signal generator, wherein the first signal corresponds to a modulation function; causing an image sensor to generate a first value based on the modulated light received from a portion of the scene and a second signal output by the signal generator, wherein the second signal corresponds to a first demodulation function of K demodulation functions, wherein the second signal includes at least one trapezoid wave; causing the image sensor to generate a second value based on the modulated light received from the portion of the scene and a third signal corresponding to a second demodulation function of the K demodulation functions; causing the image sensor to generate a third value based on the modulated light received from the portion of the scene and a fourth signal corresponding to a third demodulation function of the K demodulation functions; and determining a depth estimate for the portion of the scene based on the first value, the second value, and the third value.

In some embodiments, K=4.

In some embodiments, causing a light source to emit modulated light toward the scene comprises: causing the light source to emit the modulated light during a first time period; causing the light source to emit the modulated light during a second time period; and causing the light source to emit the modulated light during a third time period, wherein the first value is based on the modulated light emitted during the first time period, the second value is based on the modulated light emitted during the second time period, and the third value is based on the modulated light emitted during the third time period.

In some embodiments, the modulation function comprises an impulse function.

In some embodiments, the K demodulation functions correspond to K correlation functions of a Hamiltonian coding scheme.

In some embodiments, the Hamiltonian coding scheme has a coding curve in a K-dimensional space corresponding to the K correlation functions of the Hamiltonian coding scheme that substantially corresponds to a Hamiltonian cycle on a K-dimensional hypercube, with two vertices omitted.

In some embodiments, the K demodulation functions and K modulation functions, including the modulation function, characterize a coding scheme having a coding curve with a length in K-dimensional space that is at least five.

In some embodiments, the signal generator comprises multiple signal generators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 3A-3F show examples of timing diagrams illustrating demodulation signals, received modulated light signals, and pixel values for a Hamiltonian coding scheme in accordance with some embodiments of the disclosed subject matter.

FIGS. 7A1-7F4 show examples of modulations functions, demodulation functions, correlations functions, and coding curves for different C-ToF coding schemes calculated as described above in connection with FIG. 6 in accordance with some embodiments of the disclosed subject matter.

FIGS. 15A-15C show examples of a test setup and test results using a hardware testing system (e.g., as described above in connection with FIG. 11) in accordance with some embodiments of the disclosed subject matter.

FIGS. 16A-16D show another example of a test setup and test results using a hardware testing system (e.g., as described above in connection with FIG. 11) in accordance with some embodiments of the disclosed subject matter.

FIG. 20 shows an example of modulations functions, demodulation functions, and correlations functions that can be used for a Hamiltonian coding scheme using five measurements to estimate depth in accordance with some embodiments of the disclosed subject matter.

DETAILED DESCRIPTION

Figure 1:
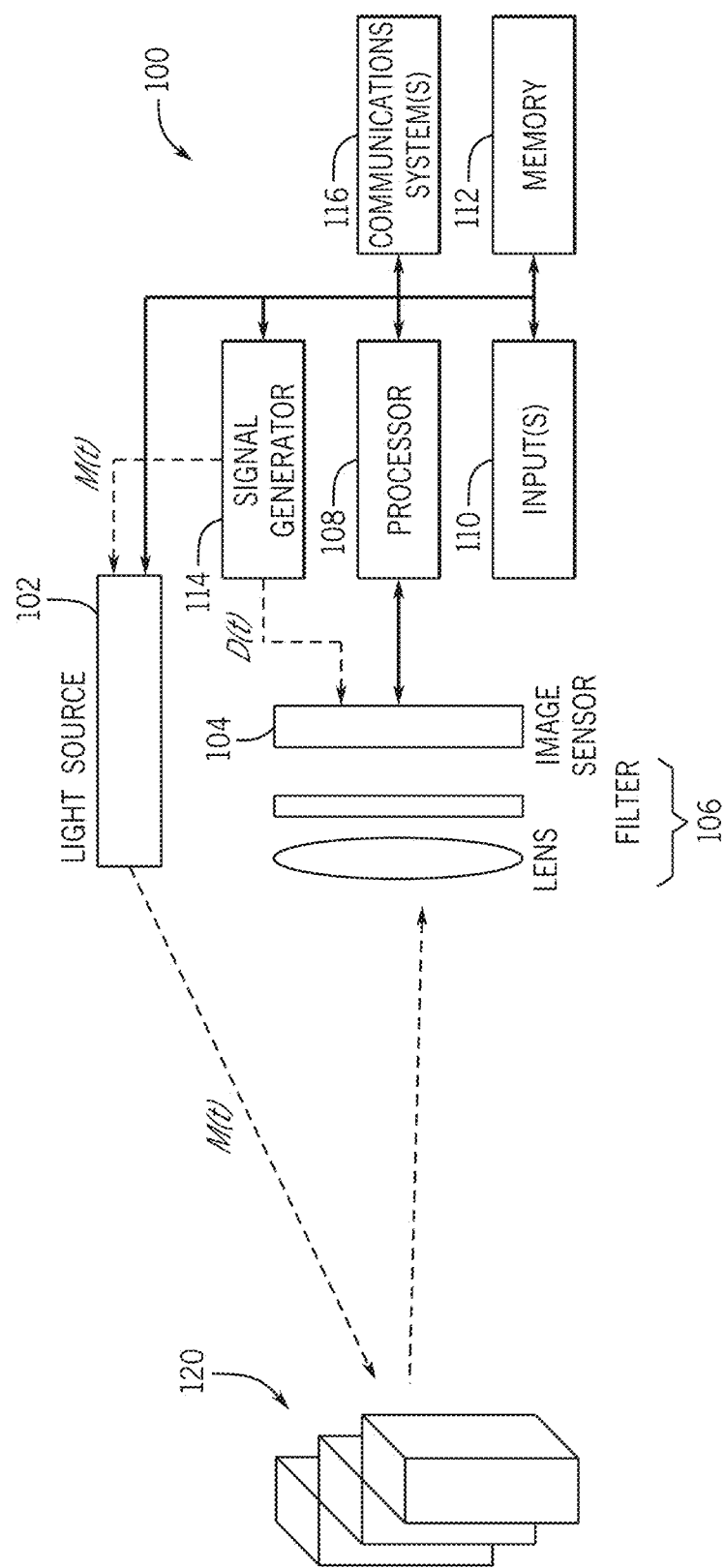
FIG. 1 shows an example of a system for continuous time-of-flight imaging is shown in accordance with some embodiments of the disclosed subject matter.

In accordance with various embodiments, mechanisms (which can, for example, include systems, methods, and media) for time-of-flight imaging encoding and decoding signals used in time-of-flight imaging are provided.

In some embodiments of the subject matter disclosed herein, continuous time-of-flight (C-ToF) systems can estimate depth in a scene based on the correlation between modulated light emitted toward the scene, and a demodulation applied at the image sensor. For example, a modulated light signal (or multiple modulation signals) can be emitted toward the scene at the beginning of multiple measurement periods, and a pixel can produce a value during each of the measurement periods based on a different demodulation signal. In such an example, the values recorded during the different measurement periods can be used to estimate the depth (e.g., the values can encode the depth). In some embodiments, noise in the image capture process can cause errors in the estimated depth, reducing the precision of the measurement system.

In some embodiments, the mechanisms described herein can use modulation functions and demodulation functions that create transfer functions that are similar to Gray codes, such that an error in the measurements is likely to create a relatively small error in the depth estimate. For example, as described below, a modulation function corresponding to a pulse can be used with demodulation functions that correspond to portions of a Hamiltonian cycle on a hypercube of K dimensions, where K corresponds to the number of measurements used to estimate the depth of the scene.

In general, given a fixed energy and time budget, the depth resolution achieved by a C-ToF imaging system can be determined by the coding (e.g., modulation and demodulation) functions that are being used. As described below, coding functions can be characterized in terms of a mean depth error metric, which can be used to determine the optimal solution for minimizing noise. However, this may require solving a high dimensional and computationally intractable global optimization problem. Alternatively, in some embodiments, a depth precision metric based on a first order differential analysis of the C-ToF image formation equations can be used to evaluate different C-ToF coding functions (including nonanalytic functions) in a geometric space. This can result in conceptual unification of seemingly disparate C-ToF coding functions, whereas previously, different C-ToF coding schemes have been analyzed separately, with concrete performance metrics available only for specific schemes (e.g., sinusoid homodyne coding). Using the mechanisms described herein, the performance of seemingly disparate coding techniques (e.g., sinusoid, square, triangle) can be compared using a common framework.

In some embodiments, coding functions that are based on Hamiltonian cycles on hypercube graphs can be used to measure depth in a C-ToF system. These Hamiltonian coding functions can exhibit similar properties to Gray codes (e.g., as used in encoding information in communication systems), and can achieve substantially higher (e.g., on the order of 10 times) depth resolution as compared to existing schemes, given the same total capture time, total power, and depth range. For instance, while some current schemes can achieve a resolution of approximately 1 centimeter at a distance of 5-10 meters with commodity hardware, a Hamiltonian coding scheme can achieve a resolution of ~1 millimeter at the same distances.

Turning to FIG. 1, an example 100 of a system for continuous time-of-flight imaging is shown in accordance with some embodiments of the disclosed subject matter. As shown, system 100 can include a light source 102; an image sensor 104; optics 106 (which can include, for example, a lens, a filter, etc.); a processor 108 for controlling operations of system 100 which can include any suitable hardware processor (which can be a microprocessor, digital signal processor, a microcontroller, an image processor, a GPU, etc.) or combination of hardware processors; an input device 110 (such as a shutter button, a menu button, a microphone, a touchscreen, a etc.) for accepting input from a user and/or from the environment; memory 112; a signal generator 114 for generating one or more modulation and/or demodulation signals; and a communication system or systems 116 for allowing communication between processor 108 and other devices, such as a smartphone, a wearable computer, a tablet computer, a laptop computer, a personal computer, a game console, a server, etc., via a communication link. In some embodiments, memory 112 can store pixel values output by image sensor 104, depth values calculated based on output from image sensor 104, etc. Memory 112 can include a storage device (e.g., a hard disk, a Blu-ray disc, a Digital Video Disk, RAM, ROM, EEPROM, etc.) for storing a computer program for controlling processor 108. In some embodiments, memory 112 can include instructions for causing processor 108 to execute processes associated with the mechanisms described herein, such as processes described below in connection with FIGS. 4 and 5.

In some embodiments, light source 102 can be any suitable light source that can be configured to emit modulated light toward a scene 120 in accordance with a modulation signal (e.g., M(t)) received from signal generator 116. For example, light source 102 can include one or more laser diodes, one or more lasers that are defocused using a concave lens, one or more light emitting diodes, and/or any other suitable light source. In some embodiments, light source 102 can emit light at any suitable wavelength. For example, light source 102 can emit visible light, near-infrared light, infrared light, etc. In a more particular example, light source 102 can be a laser diode that emits light centered around 830 nm that can be modulated using any suitable signal. In a yet more particular example, light source 102 can be an L830P200 laser diode (available from Thorlabs, Inc., headquartered in Newton, N.J.) that can be modulated with arbitrary waveforms by an external signal of up to 500 MHz bandwidth.

In some embodiments, image sensor 104 can be any suitable image sensor that can receive modulated light reflected by scene 120 and, using a demodulation signal (e.g., D(t)) from signal generator 116, generate signals that are indicative of the time elapsed from when the modulated light was emitted by light source 102 until it reached image sensor 104 after being reflected by scene 120. Any suitable technique or combination of techniques can be used to generate signals based on the demodulation signal received from signal generator 116. For example, the demodulation signal can be an input to a variable gain amplifier associated with each pixel, such that the output of the pixel is based on the value of the demodulation signal when the modulated light was received (e.g., by amplifying the signal produced by the photodiode). As another example, the demodulation signal can be used as an electronic shutter signal that controls an operational state of each pixel. As yet another example, the demodulation signal can be used as an input and/or control signal for a comparator associated with each pixel that compares the signal generated by a photodiode in the pixel to a threshold, and outputs a binary signal based on the comparison. As still another example, the demodulation signal can be used to control an optical shutter. In such an example, the optical shutter can be a global shutter and/or a shutter associated with individual pixels or groups of pixels (e.g., an LCD shutter). Note that in some embodiments, light source 102 and image sensor 104 can be co-located (e.g., using a beam splitter or other suitable optics).

In some embodiments, optics 106 can include optics for focusing light received from scene 120, one or more narrow bandpass filters centered around the wavelength of light emitted by light source 102, any other suitable optics, and/or any suitable combination thereof. In some embodiments, a single filter can be used for the entire area of image sensor 104 and/or multiple filters can be used that are each associated with a smaller area of image sensor 104 (e.g., with individual pixels or groups of pixels).

In some embodiments, signal generator 114 can be one or more signal generators that can generate signals to control light source 102 using a modulation signal and provide demodulation signals for the image sensor. In some embodiments, as described below, signal generator 114 can generate two different types of signals (e.g., an impulse train and a Hamiltonian code), that are synchronized (e.g., using a common clock signal). Although a single signal generator is shown in FIG. 1, any suitable number of signal generators can be used in some embodiments. Additionally, in some embodiments, signal generator 114 can be implemented using any suitable number of specialized analog circuits each configured to output a signal that can be used to implement a particular coding scheme.

In some embodiments, system 100 can communicate with a remote device over a network using communication system(s) 116 and a communication link. Additionally or alternatively, system 100 can be included as part of another device, such as a smartphone, a tablet computer, a laptop computer, etc. Parts of system 100 can be shared with a device within which system 100 is integrated. For example, if system 100 is integrated with a smartphone, processor 108 can be a processor of the smartphone and can be used to control operation of system 100.

In some embodiments, system 100 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 116 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 100 and another device, such as a network link, a dial-up link, a wireless link, a hard-wired link, any other suitable communication link, or any suitable combination of such links. System 100 and/or another device (e.g., a server, a personal computer, a smartphone, etc.) can enable a user to execute a computer program uses information derived using the mechanisms described herein to, for example, control a user interface.

It should also be noted that data received through the communication link or any other communication link(s) can be received from any suitable source. In some embodiments, processor 108 can send and receive data through the communication link or any other communication link(s) using, for example, a transmitter, receiver, transmitter/receiver, transceiver, or any other suitable communication device.

Figure 2:
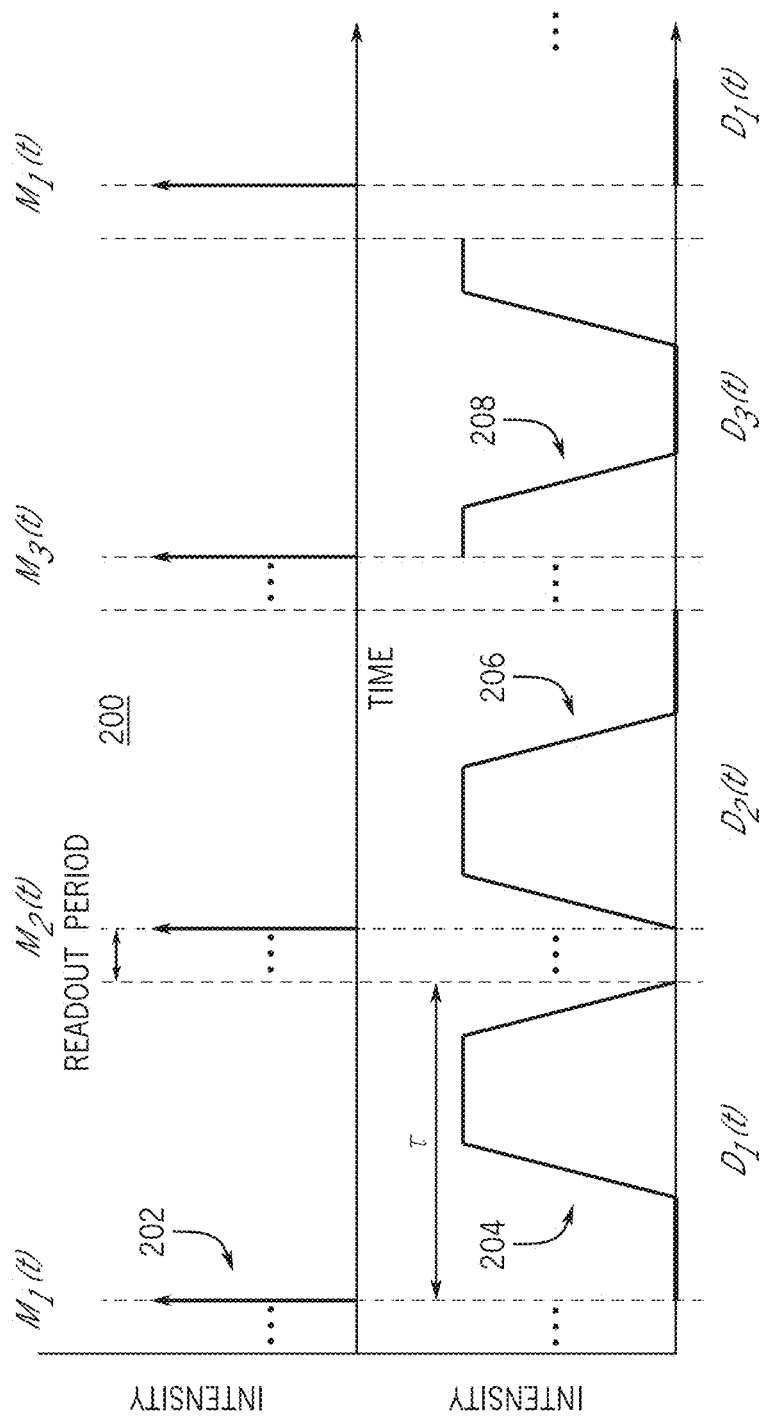
FIG. 2 shows an example of a timing diagram illustrating modulation and demodulation signals for a Hamiltonian coding scheme in accordance with some embodiments of the disclosed subject matter.

FIG. 2 shows an example 200 of a timing diagram illustrating modulation and demodulation signals for a Hamiltonian coding scheme in accordance with some embodiments of the disclosed subject matter. As described below in connection with FIGS. 6 and 7, a coding scheme can be characterized by a coding curve that is a geometric representation of the coding scheme, which can be calculated by plotting the values of the correlation functions (e.g., produced by interactions between the modulation and demodulation functions as described below in connection with FIGS. 6 and 7) in K dimensions, where K corresponds to the number of measurements taken to determine a single distance measurement. In general, there are at least three properties of a coding scheme that may have an effect on the precision of a depth measurement when used in a C-ToF system. First, the mean depth precision is generally inversely proportional to the coding curve length. Accordingly, coding schemes characterized by longer coding curves generally produce more precise results. Second, if the coding curve is self-intersecting, the same unknown point in the scene will correspond to the same distance. Accordingly, coding schemes that are not self-intersecting generally ensure a unique mapping between unknown points (referred to herein using U, as described below) and measurement points (referred to herein using B, as described below). Third, if the Euclidean distance between two points in the K-dimensional space in which the coding curve is defined is relatively small, but the two points are relatively far apart as measured along the length of the coding curve, a relatively small amount of noise could cause the system to estimate the distance to a point that actually corresponds to the first point as being at the distance corresponding to the second point, or vice versa, resulting in a large error (e.g., due to the large distance along the coding curve). Accordingly, coding curves for which the distance between two points measured along the curve are proportional to the Euclidean distance between the two points are generally less susceptible to large errors caused by noise. For example, a coding curve for which the intensity partial derivatives (e.g., $$\frac{\partial B}{\partial \Gamma}$$

as described below in connection with FIGS. 6 and 7) are continuous, and thus, small image noise does not result in large depth errors during decoding.

A family of curves that has desirable traits for all three of the above properties are Hamiltonian cycles on hypercube graphs. A hypercube graph $\mathcal{Q}_K$ is the graph formed from the vertices and edges of the K-dimensional hypercube. For example, the graph $Q_3$ is formed on a 3-D cube, and has eight vertices (one for every cube corner) and twelve edges. A Hamiltonian cycle is a cycle (i.e., a closed loop) through a graph that visits every vertex exactly once while traversing the edges of the graph. Hamiltonian cycles tend to be long, non-self intersecting and generally have good locality preserving properties. In some embodiments, C-ToF coding schemes based on Hamiltonian cycles, (sometimes referred to herein as Hamiltonian coding schemes) which have coding curves that are Hamiltonian cycles on portions of hypercube graphs can be used to generate more precise distance measurements than other coding schemes (e.g., sine wave based coding schemes). The correlation functions of such Hamiltonian coding schemes are Hamiltonian functions, where the $i^{th}$ Hamiltonian function $hamilt_{K,i}(t)$ can be defined as the value of the $i^{th}$ coordinate of points on a Hamiltonian cycle of the K-dimensional unit hypercube. FIG. 2 shows an example of a modulation function 202 and demodulation functions 204-208 that can be used to generate transfer functions that lie along a Hamiltonian cycle on a cube in three dimension (i.e., K=3). The transfer functions in the Hamiltonian coding scheme shown in FIG. 2 can correspond to the demodulation functions. While constructing a Hamiltonian cycle based coding curve, the origin $0_K=[0, \ldots, 0]$ and the diagonally opposite vertex $1_K=[1, \ldots, 1]$ can be excluded so that the coding curve does not pass through these two vertices, which can ensure that for every depth value $\Gamma$, at least two of the correlation function values are different, i.e., $\mathcal{F}_i(\Gamma) \neq \mathcal{F}_j(\Gamma)$ for some index pair i, j. For example, FIGS. 3A-3F shows the demodulation signals 204-208, and the value of each signal corresponds to at most one other signal at any given time. In general, there are several possible Hamiltonian cycles on a hypercube graph, each corresponding to a different coding curve and coding scheme, the example shown in FIGS. 2, 3 and 7 are merely one example for K=3. Examples of demodulation signals for Hamiltonian schemes for K=4 and K=5 are described below in connection with FIG. 9. Note that although the modulation signal is shown as an impulse and the demodulation signals are shown as corresponding to Hamiltonian cycles on a hypercube to generate the correlation signals, other combinations of signals can be used to generate the correlation functions corresponding to a Hamiltonian coding scheme.

As shown in FIG. 2, modulation signal 202 can be an impulse that is applied at the beginning of each integration period $\tau$, and demodulation signals 204-206 can be applied to the image sensor (e.g., image sensor 104). In some embodiments, the period between impulses can be $\tau$ plus a time for reading out image data from the image sensor. As illustrated, each of the demodulation functions has a different profile within time period $\tau$, with signals 204 and 206 forming trapezoid waves that start and end low, within time period $\tau$. Signal 208, by contrast can include two halves of a trapezoid wave such that the profile of signal 208 starts and ends high, and goes low between during time period $\tau$. In some embodiments, signals 202-208 can be generated by a single signal generator operating in two or more different channels, or from any suitable number of signal generators. For example, signals 204-208 can be time shifted versions of the same signal produced by a single signal generator, or can be generated by different signal generators. In some embodiments, trapezoid waves can be generated using any suitable technique or combination of techniques. For example, a triangle wave can be clipped at the high level desired for the trapezoid wave to produce a waveform that is approximately a trapezoid wave. As another example, a sinusoidal wave can be clipped to produce a waveform that is approximately a trapezoid wave.

FIGS. 3A-3F show examples of timing diagrams illustrating demodulation signals, received modulated light signals, and pixel values for a Hamiltonian coding scheme in accordance with some embodiments of the disclosed subject matter. As shown in FIGS. 3A-3F, a light pulse 302 corresponding to the modulation function is received at a pixel p from a scene being imaged at approximately the same time in each of three measurement periods, where the time at which the signal is received corresponds to the depth at the point in the scene corresponding to the pixel. The received signal 302 is modulated by each of the demodulation functions provided to the signal processor such that pixel values 304-308 are generated over an integration period $\tau$. As shown in FIGS. 3A-3F, the pixel values produced during each time period are different based on the time when signal 302 is received. In some embodiments, the final value for each pixel can be read out after the integration period $\tau$ has elapsed. As described below in connection with FIGS. 6 and 7, the three pixel values can encode the depth of the scene corresponding to pixel p.

Figure 4:
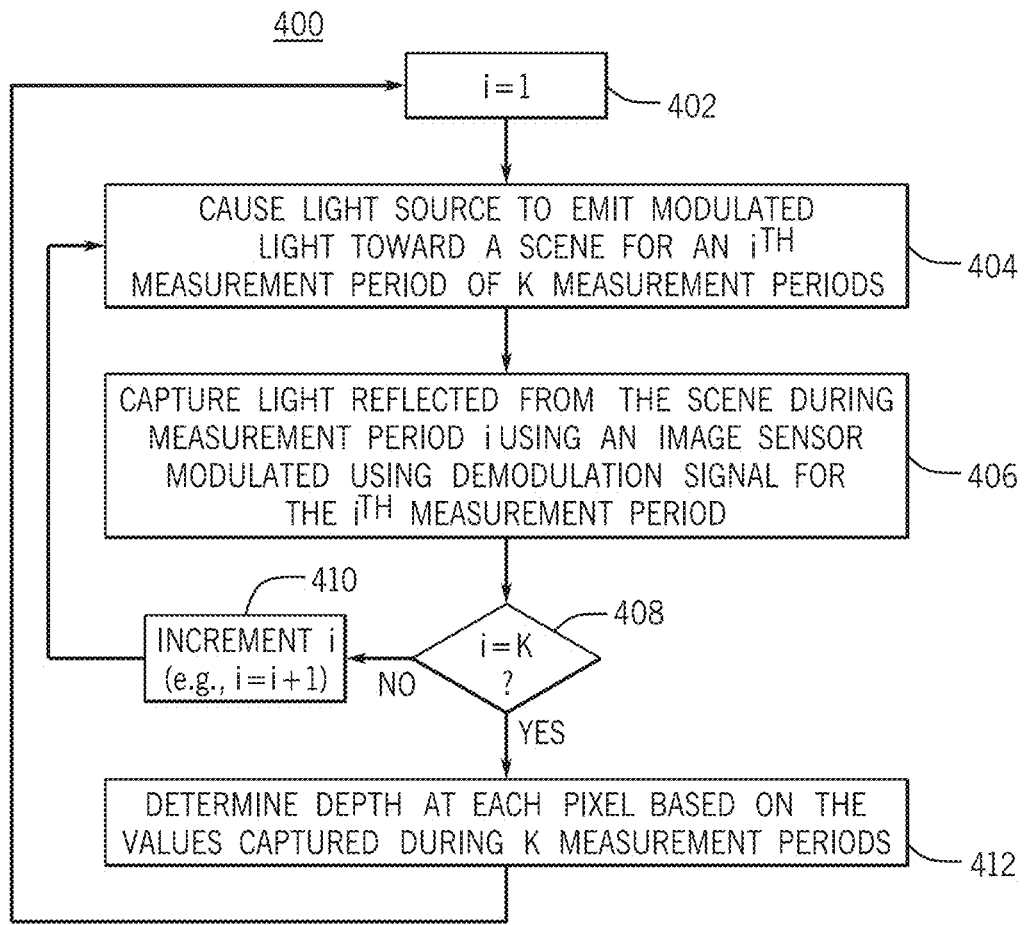
FIG. 4 shows an example of a process for measuring depth in a scene in accordance with some embodiments of the disclosed subject matter.

FIG. 4 shows an example 400 of a process for measuring depth in a scene in accordance with some embodiments of the disclosed subject matter. As shown in FIG. 4, process 400 can start at 402 with an index i equal to 1. At 404, process 400 can cause a light source to emit modulated light toward a scene for an $i^{th}$ measurement of K measurements (i.e., corresponding to the K measurements used to determine a depth value as described below in connection with FIG. 6) to be taken to calculate a depth value.

At 404, process 400 can cause a light source (e.g., light source 102) to emit modulated light toward a scene (e.g., scene 120) using a modulation function corresponding to the $i^{th}$ measurement (e.g., $M_i(t)$) of K measurements that are to be captured. In some embodiments, the modulation function corresponding to each measurement period can be the same. For example, as shown in FIG. 2, each modulation function $M_1(t)$, $M_2(t)$ and $M_3(t)$ is an impulse. Alternatively, different modulation functions can be used corresponding to different measurement periods.

At 406, process 400 can cause light reflected from the scene to be captured during measurement period i using an image sensor (e.g., image sensor 104) modulated using a demodulation signal corresponding to the $i^{th}$ measurement period. In some embodiments, the demodulation function corresponding to each measurement period can be different (e.g., can have a different profile). For example, as shown in FIGS. 2 and 3, each demodulation function $D_i(t)$ is different. Note that although demodulation signals are generally described herein in a particular order (e.g., $D_1(t)$, $D_2(t)$, etc.), this is merely an example of an order in which the demodulation signals can be applied, but the demodulation signals can be applied in any order (or in any combinations) that can be used to generate a depth value. For example, rather than applying demodulation signal $D_1(t)$ during the first integration period, process 400 can apply demodulation signal $D_3(t)$, and can apply demodulation signal $D_1(t)$ during the second integration period.

At 408, process 400 can determine whether K measurements have been captured. If process 400 determines that K measurements have not been captured ("NO" at 408), i can be incremented by one, and process 400 can return to 404. Otherwise, if process 400 determines that K measurements have been captured ("YES" at 408), process 400 can proceed to 412.

At 412, process 400 can determine a depth value corresponding to each pixel for which K measurements have been captured. In some embodiments, process 400 can use any suitable technique or combination of techniques to determine the depth value for each pixel. For example, a technique for determining depth from values captured using Hamiltonian codes is described below in connection with FIG. 7A1-7F4. In some embodiments, process 400 can return to 402 to begin capturing data for generating a new depth value. Note that although process 400 is described as incrementing an index i, this is merely for ease of explanation, and such an index may not be used to control operation of a C-ToF system. For example, the signal generator can be controlled to emit various modulation and/or demodulation signals using any suitable control scheme that can be configured to output such signals corresponding to the coding scheme being used at appropriate times. Additionally, in some embodiments, the signal generator can be configured to simultaneously emit multiple demodulation signals that can be used by an image sensor configured to capture information simultaneously (e.g., where a group of adjacent pixels are simultaneously demodulated using different demodulation signals to capture depth information for a patch of a scene corresponding to the group of pixels during a single measurement period).

Figure 5:
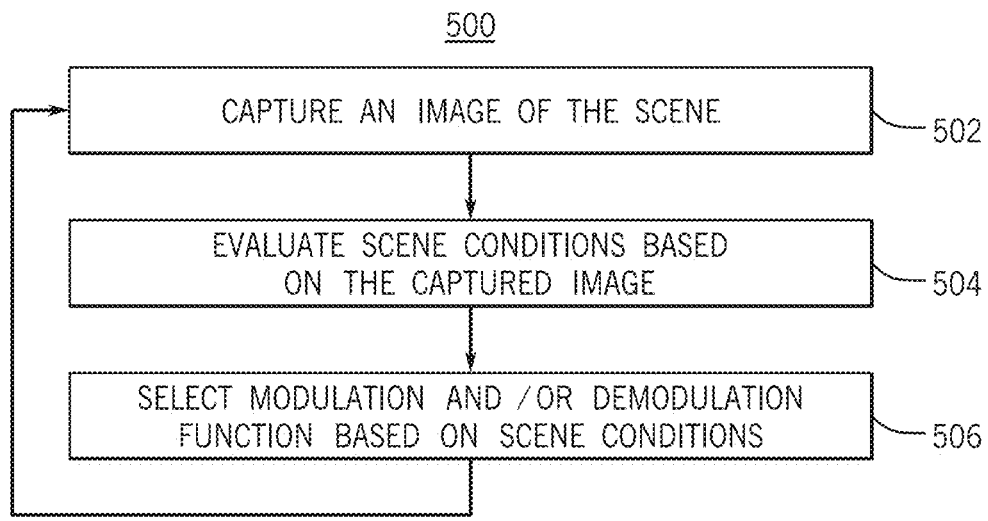
FIG. 5 shows an example of a process for adaptively selecting a coding scheme based on imaging conditions in accordance with some embodiments of the disclosed subject matter.

FIG. 5 shows an example 500 of a process for adaptively selecting a coding scheme based on imaging conditions in accordance with some embodiments of the disclosed subject matter. As shown in FIG. 5, process 500 can begin at 502 by causing an image sensor to capture an image of the scene to be imaged. Such an image can be captured using ambient light to determine conditions of the environment in which the C-ToF system is being used. Additionally or alternatively, any other suitable sensor (e.g., a light meter, a thermal measurement device, etc.) can be used to capture information about the environment. In some embodiments, process 500 can cause the image sensor of the C-ToF system executing process 500 to capture an image without modulation, which can be used to evaluate environmental conditions in the wavelength used by the C-ToF system. In some embodiments, process 500 can cause an image to be captured with an optical shutter closed to determine current noise parameters caused by the image sensor itself.

At 504, process 500 can evaluate scene conditions based on the captured image using any suitable technique or combination of techniques. For example, process 500 can determine the amount of ambient light in the scene using the image captured at 502. As another example, process 500 can evaluate the image to determine the amount of noise in the image data.

At 506, process 500 can select modulation and/or demodulation functions (e.g., a coding scheme) based on the scene conditions determined at 504. For example, some coding schemes can be capable of generating more precise measurements in low noise and/or low ambient light conditions, but are more susceptible to errors in higher noise and/or brighter ambient light conditions. In such an example, process 500 can determine whether the conditions are more favorable for a particular coding scheme, and can select modulation function(s) and/or demodulation function(s) accordingly. In a more particular example, as described below in connection with FIGS. 10-12, Hilbert coding schemes can produce more precise measurements than Hamiltonian coding schemes under low noise conditions (e.g., when there is a high SNR), but may produce less precise measurements in relatively higher noise conditions. Accordingly, process 500 can select a coding scheme that is appropriate to current conditions.

Figure 6:
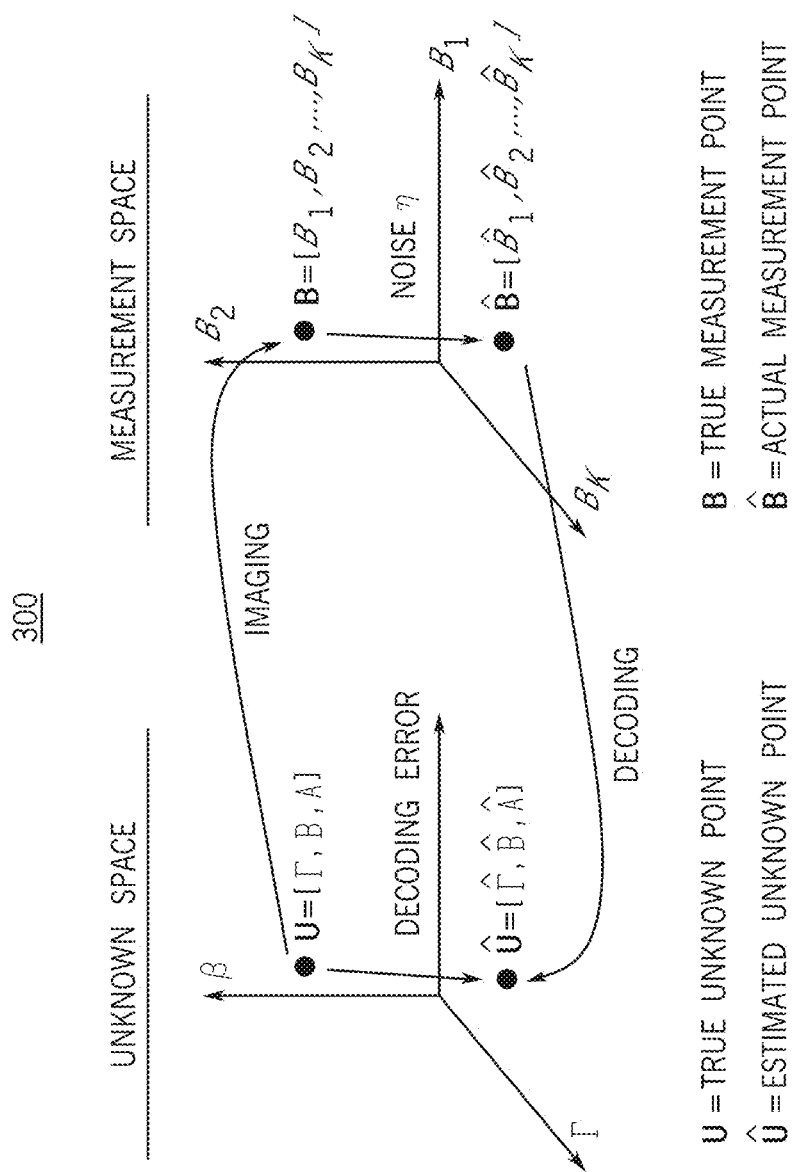
FIG. 6 shows an example of a mapping between points in an unknown space (e.g., a scene being measured) and a measurement space in accordance with some embodiments of the disclosed subject matter.

FIG. 6 shows an example of a mapping between points in an unknown space (e.g., a scene being measured) and a measurement space in accordance with some embodiments of the disclosed subject matter. In general, as described above in connection with FIG. 1, a C-ToF imaging system includes a temporally modulated light source (e.g., light source 102), and an image sensor that can be temporally modulated during integration time to produce a modulated exposure. The radiant intensity of the light source at time t can be characterized as $M(t)$, $(0 \leq M(t) < M_0)$, where $M_0$ is the peak instantaneous intensity of the lighter source. The function $M(t)$, sometimes referred to herein as the source modulation function (or modulation function), can be a continuous function (e.g., a sinusoid), or a non-continuous function (e.g., an impulse train function). Note that a C-ToF system using an impulse train source modulation function is not an impulse ToF system, as such systems directly measure the time delay between the emitted and received pulse. By contrast, in a C-ToF system, the system measures the time delay indirectly by measuring the temporal correlation between the received modulated light and the demodulation signal, thus typically requiring multiple measurements.

For a sensor pixel p that images a scene point S, the scene distance at pixel p can be characterized by a function $\Gamma(p)$. In the description below, it is assumed that there is no indirect or multi-bounce light component. That is, light from the light source is assumed to bounce only once at a scene point and return to the image sensor. Radiance $L(p, t)$ incident at pixel p at time t can be represented as:

$$L(p, t) = \beta(p) M\left(t - \frac{2\Gamma(p)}{c}\right) + L_a(p), \quad (1)$$

where c is the speed of light. $\beta(p)$ represents: the scene point's albedo and bidirectional reflectance distribution function (BRDF); and light fall-off. $L_a(p)$ represents the radiance component due to an ambient light source (e.g., sun in outdoor settings). The light emitted from the source $M(t)$ is time-shifted by $$\frac{2\Gamma(S)}{c}$$

due to propagation along the path from source to scene to sensor, the intensity is scaled by $\beta(S)$, and a constant offset $L_a(p)$ is added due to ambient illumination.

In some embodiments, the image sensor exposure can be temporally modulated according to the demodulation function $D(t)$, $(0 \leq D(t) \leq 1)$, where both the modulation and demodulation functions are periodic. The demodulation function (also sometimes referred to herein as the sensor exposure function) can be physically realized using a variety of techniques, as described above in connection with FIG. 1, such as on-chip gain modulation, external optical shutters, etc.

The brightness $B(p)$ measured at pixel p can be determined based on the correlation between the incoming radiance and the exposure function:

$$B(p) = \int_0^\tau D(t) L(p, t) dt, \quad (2)$$

where $\tau$ is the sensor integration time. Substituting Equation 1 into Equation 2:

$$B(p) = \beta(p) \int_0^\tau D(t)M\left(t - \frac{2\Gamma(p)}{c}\right)dt + A(p), \quad (3)$$

where $$A(p) = L_a(p) \int_0^\tau D(t)M\left(t - \frac{2\Gamma(p)}{c}\right)dt$$

dt is the ambient component of the measured brightness. Next, $\mathcal{F}(\Gamma)$, $(0 \leq \mathcal{C}(\Gamma) \leq 1)$ can be defined as the normalized correlation function between modulation and demodulation functions:

$$\mathcal{F}(\Gamma) = \frac{\int_0^\tau D(t)M\left(t - \frac{2\Gamma(p)}{c}\right)dt}{M_{total}}, \quad (4)$$

where the normalization factor $M_{total} = \int_0^\tau M(t)dt$ is the total flux emitted by the light source towards point S during the sensor integration time τ. Substituting Equation 4 into Equation 3, and placing the constant $M_{total}$ within the scale factor β(p):

$$\boxed{B(p) = \beta(p)\mathcal{F} + A(p)} \quad (5)$$

*Image Formation Equation for C-ToF Imaging*

Equation 5 can be characterized as the image formation equation for C-ToF imaging, and can represent the image intensity B measured at a sensor pixel in terms of three unknowns: scene distance Γ; albedo factor β; and an ambient brightness component A. Given an imaging scenario (defined in terms of albedos β and ambient component A), Equation 5 can be used to characterize a C-ToF imaging system by its normalized correlation functions $\mathcal{F}(\Gamma)$, which in turn can be characterized based on the modulation and demodulation functions. That is, $\mathcal{F}(\Gamma)$ is independent of the scene properties (albedos, ambient light) and device characteristics (sensor integration time, light source power).

The space of all possible values of unknowns Γ, β and A, can be represented as a 3D unknown space, as shown in FIG. 6, in which a point U=[Γ, β, A] in the unknown space is sometimes referred to herein as an unknown point. Each unknown point represents a three element unknown vector of the distance Γ, the albedo β of the scene at that point, and ambient conditions A. With three unknowns, K≥3 intensity measurements $[B_1, B_2, \ldots, B_K]$ can be captured using K different correlation functions $[\mathcal{F}_1, \mathcal{F}_2, \ldots, \mathcal{F}_K]$, corresponding to K different pairs of modulation and demodulation functions $M_i$ and $D_i$, where each intensity measurement can be characterized by:

$$B_i(p) = \beta(p)\mathcal{F}_i(\Gamma) + A(p).$$

The K-dimensional space of measured intensities $[B_1, \ldots, B_K]$ is sometimes referred to herein as the measurement space, as shown in FIG. 6.

A point $B=[B_1, \ldots, B_K]$ in the measurement space can be considered a valid measurement point if $[B_1, \ldots, B_K]$ are the intensity measurements corresponding to an unknown point U. A C-ToF coding scheme can be defined as a function $\mathcal{C}: U \to B$ from the set of unknown points U to measurement points B. A coding scheme $\mathcal{C}$ can be completely characterized by a set of correlation functions $[\mathcal{F}_1, \ldots, \mathcal{F}_K]$, or equivalently, by sets of modulation and demodulation functions $[M_1, \ldots, M_K]$ and $[D_1, \ldots, D_K]$, respectively.

The process of recovering depths can be modeled as a decoding function $\mathcal{D}: B \to U$ from the measurement space to the unknown space, as shown in FIG. 6. The decoding function can be implemented using any suitable technique or combination of techniques. For example, the decoding function can be implemented using an analytic expression, a look-up table, a statistical procedure (e.g., maximum likelihood estimation), any other suitable technique, or any suitable combination thereof. If there were no image noise, given a measurement B, the decoding function would accurately recover the true unknown, and hence, the correct depth. Considering a coding scheme $\mathcal{C}$ that maps an unknown point U to the true (noise-free) measurement point $B=[B_1, \ldots, B_K]$. Let the actual measurement $\hat{B}_i$ be given as:

$$\hat{B}_i = B_i + \eta_i, \quad (6)$$

where $\eta_i = \Delta B_i = \hat{B}_i - B_i$ is the noise in the intensity measurement $B_i$. In C-ToF systems, both read noise and photon noise are typically present in generated intensities. $\eta_i$ can be modeled as a Gaussian random variable with standard deviation $\sigma_i$ (i.e., $\eta_i \sim \mathcal{N}(0, \sigma_i)$) to represent noise in the system. Due to noise, the decoding function $\mathcal{D}$ estimates an incorrect unknown point $\hat{U}=[\hat{\Gamma}, \hat{\beta}, \hat{A}]$, which results in depth errors $\Delta\Gamma = |\hat{\Gamma} - \Gamma|$, as shown in FIG. 6. The expected depth error $\overline{\Delta\Gamma_\mathcal{C}}(U)$ for an unknown U and a coding scheme $\mathcal{C}$, can be represented as:

$$\overline{\Delta\Gamma_\mathcal{C}}(U) = \int_{\hat{B}} |\hat{\Gamma} - \Gamma| p(\hat{B}|B) d\hat{B}, \quad (7)$$

where $p(\hat{B}|B) \sim \mathcal{N}(B, \Sigma)$ is the probability distribution function of the actual measured intensity $\hat{B}=[\hat{B}_1, \ldots, \hat{B}_K]$. The covariance matrix Σ is given by the amount of image noise. The integral can be taken over the K-dimensional measurement space.

Equation 7 above can be used to represent the expected depth error $\overline{\Delta\Gamma_\mathcal{C}}(U)$ for a single unknown point U, where the mean expected depth error $\overline{\Delta\Gamma_\mathcal{C}}$ can be determined by averaging $\overline{\Delta\Gamma_\mathcal{C}}$ over the space of all unknowns:

$$\overline{\Delta\Gamma_C} = \frac{1}{V_U} \int_U \overline{\Delta\Gamma_C}(U) dU, \quad (8)$$

where $V_U = (\Gamma_{max} - \Gamma_{min})(\beta_{max} - \beta_{min})(A_{max} - A_{min})$ is the volume of the space of unknowns ($\Gamma_{min} \leq \Gamma \leq \Gamma_{max}$, $\beta_{min} \leq \beta \leq \beta_{max}$, $A_{min} \leq A \leq A_{max}$). Substituting Equation 7 into Equation 8:

$$\boxed{\overline{\Delta\Gamma_C} = \frac{1}{V_U} \int_U \int_{\hat{B}} |\hat{\Gamma} - \Gamma| p(\hat{B}|B) d\hat{B} dU} \quad (9)$$

*Mean Expected Depth Error of a C-ToF Coding Scheme*

The mean expected error can be used as a global performance metric of a C-ToF coding scheme. It is an intrinsic property of a C-ToF coding scheme and is independent of choice of techniques used for reconstruction. Accordingly, an optimal coding scheme can be defined as the one that minimizes the mean expected depth error over a given unknown space:

$$C_{opt} = \underset{C}{\arg\min} \overline{\Delta \Gamma_C}, \quad (10)$$

Although this criteria can be expressed concisely, finding the optimal codes is a formidable constrained global optimization problem, with no known analytical or closed form solutions. It is computationally intensive to even evaluate this metric numerically as it involves computing a double integral over high-dimensional unknown and measurement spaces. Accordingly, this precludes the development of an efficient numerical (or an exhaustive search-based optimization) procedure due to prohibitively high computational costs. Alternatively, a different depth-precision metric based on first order differential analysis of the image formation equation can be used to characterize different coding schemes to facilitate comparison of different coding schemes. This metric can be geometrically represented, and can be computed relatively quickly, facilitating evaluation of different coding schemes.

In the description above, the analysis is based on the relationship between depth error $\Delta\Gamma$ and intensity noise $\Delta B = \hat{B} - B = \eta$. However, performance can also be analyzed based on the relationship between the corresponding differential quantities $\partial\Gamma$ and $\partial B$. Taking the partial derivative of the intensity $B_i$ (as described above in connection with Equation 5) with respect to $\Gamma$:

$$\frac{\partial B_i}{\partial \Gamma} = \beta \mathcal{F}'_i(\Gamma),$$

where $\mathcal{F}'_i(\Gamma)$ is the derivative of correlation function $\mathcal{F}_i(\Gamma)$. For ease of exposition, albedo factor $\beta$ can be assumed to be independent of the scene depths, however, in practice, $\beta$ may depend on scene depths due to distance fall-off. This depth dependence can be absorbed into the correlation function $\mathcal{F}_i(\Gamma)$. The partial derivative of the measurement vector $B=[B_1, B_2, \ldots, B_K]$ can be represented by:

$$\left|\frac{\partial B}{\partial \Gamma}\right| = \sqrt{\sum_{i=1}^{K} \left(\frac{\partial B_i}{\partial \Gamma}\right)^2} = \beta \sqrt{\sum_{i=1}^{K} \mathcal{F}'_i(\Gamma)^2}$$

The terms can be rearranged, and represented as:

$$|\partial \Gamma| = \frac{|\partial B|}{\beta \sqrt{\sum_{i=1}^{K} \mathcal{F}'_i(\Gamma)^2}}, \quad (11)$$

Equation 11 expresses the differential depth error $|\partial \Gamma|=|\hat{\Gamma}-\Gamma|$ due to small measurement noise $|\partial B|=\sqrt{\sum_{i=1}^{K} \partial B_i^2}$, where $\partial B_i = \hat{B}_i - B_i$. Since noise is typically random, both $|\partial B|$ and $|\partial \Gamma|$ are random variables, with standard deviations $\Omega$ and $\sigma_\Gamma$, respectively. From Equation 11, it follows that $\Omega$ and $\sigma_\Gamma$ are related as:

$$\sigma_\Gamma = \frac{\Omega}{\beta \sqrt{\sum_{i=1}^{K} \mathcal{F}'_i(\Gamma)^2}}, \quad (12)$$

Based on the above, $$\chi = \frac{1}{\sigma_\Gamma}$$

can be used as a depth precision measure:

$$\chi(U) = \frac{1}{\sigma_\Gamma} = \frac{\beta \sqrt{\sum_{i=1}^{K} \mathcal{F}'_i(\Gamma)^2}}{\Omega}, \quad (13)$$

where $\chi(U)$ denotes the dependence of $\chi$ on the unknown point U. Since $\chi$ is the inverse of depth standard deviation $\sigma_\Gamma$, a larger value of $\chi$ produces a lower overall depth error. $\chi(U)$, as defined above, is the depth precision corresponding to a single unknown point U. The mean depth precision $\chi_C$ of a coding scheme $C$ is given by averaging $\chi(U)$ over the space of all unknowns $\Gamma_{min} \leq \Gamma \leq \Gamma_{max}$, $\beta_{min} \leq \beta \leq \beta_{max}$, $A_{min} \leq A \leq A_{max}$:

$$\chi_C = \frac{1}{V_U}\int_U \chi(U)dU = \frac{1}{V_U}\int_\Gamma \int_\beta \int_A \chi(U) dA\, d\beta\, d\Gamma, \quad (14)$$

where $V_U = (\Gamma_{max}-\Gamma_{min})(\beta_{max}-\beta_{min})(A_{max}-A_{min})$ is the volume of the unknown space. Substituting Equation 13 into Equation 14, and simplifying with the assumption that the noise standard deviation $\Omega = \sqrt{\sum_{i=1}^{K} \sigma_i^2}$ is constant (note that $\Omega$ is a function of image intensity, and varies for different unknown points; however, for simplicity, $\Omega$ can be assumed to be a constant corresponding to the upper bound of noise over all possible measurement points):

$$\chi_C = \frac{\beta_{mean} \int_\Gamma \sqrt{\sum_{i=1}^{K} \mathcal{F}'_i(\Gamma)^2}\, d\Gamma}{\Omega \Gamma_{range}}, \quad (15)$$

where $\Gamma_{range} = \Gamma_{max} - \Gamma_{min}$ is the unambiguous depth range, and $$\beta_{mean} = \frac{(\beta_{min} + \beta_{max})}{2}$$

is the mean albedo factor. The term inside the integral in the above equation can be represented using a geometric construct sometimes referred to herein as a coding curve.

For a coding scheme $C$ defined by the correlation functions $[\mathcal{F}_1, \ldots, \mathcal{F}_K]$, the coding curve can be generated by plotting the values of the correlation functions $[\mathcal{F}_1(\Gamma), \ldots, \mathcal{F}_K(\Gamma)]$ in the K-dimensional space, as the depth $\Gamma$ is varied. More formally, the coding curve $\Psi_C$ can be defined as the following set of points in K-dimensional space:

$$\Psi\mathcal{F} = \{[\mathcal{F}_1(\Gamma), \mathcal{F}_2(\Gamma), \ldots, \mathcal{F}_K(\Gamma)] | \Gamma_{min} \leq \Gamma \leq \Gamma_{max}\}$$

The coding curve can be a geometric representation of a coding scheme; given a scheme's correlation functions, the coding curve can be determined, and vice versa. For example, the coding curve for sinusoid coding is a circle in K-dimension space (e.g., as shown in FIG. 7A4, for K=3).

The length $\mathcal{L}_{curve}$ of the coding curve can be represented in terms of partial derivatives $\mathcal{F}'_i$:

$$\mathcal{L}_{curve} = \int_{\Gamma_{min}}^{\Gamma_{max}} \sqrt{\sum_{i=1}^{K} \mathcal{F}'_i(\Gamma)^2} d\Gamma. \quad (16)$$

Substituting Equation 16 into Equation 15, the relationship between the mean depth precision of a coding scheme can be represented based on the length of the coding curve:

$$\boxed{\overline{\chi_C} = \frac{\beta_{mean} \mathcal{L}_{curve}}{\Omega \Gamma_{range}}} \quad (17)$$

Depth Precision of a C-ToF Coding Scheme

As can be appreciated from Equation 17, the depth precision $\overline{\chi_C}$ of a coding scheme is directly proportional to the coding curve length of the coding scheme. For example, given a set of unknown points, a longer coding curve spreads the measurement points further apart in the measurement space, resulting in lower depth errors due to noise during decoding. Thus, in general, the coding curve length (and hence, the depth precision $\overline{\chi_C}$) is inversely proportional to the mean depth error $\overline{\Gamma_C}$. However, this is not true in all situations, such as if a coding curve is self-intersecting or has sharp turns. In such situations, the differential analysis, which assumes that the derivatives $\partial Bi/\partial \Gamma$ are continuous, does not hold. Such a curve, despite being long, may result in large depth errors. The coding curve and its length are simple and fast to compute geometric properties of coding schemes (even non-analytic schemes), thus making them a compact representation that can be used to evaluate C-ToF coding schemes.

As can also be appreciated from Equation 17, the depth precision $\overline{\chi_C}$ is directly proportional to the mean albedo factor $\beta_{mean}$ and inversely proportional to measurement noise $\Omega$. This result corresponds to the physical phenomena used to determine depth in C-ToF systems, since a larger magnitude signal (proportional to albedo, $\beta_{mean}$) received by the image sensor and the lower the noise present in the system, higher precision is expected. Further, there is an inverse relationship between the depth precision and the depth range $\Gamma_{range}$. A small unambiguous depth range $\Gamma_{range}$ results in higher depth precision (lower depth errors), and vice versa. A similar tradeoff between the depth range and depth error has previously been recognized in sinusoid coding systems. The depth precision equation derived above generalizes the range-precision relationship for any valid C-ToF coding scheme, and thus, facilitates comparisons of performance for general classes of coding schemes on a common ground, by fixing the depth range $\Gamma_{range}$ (the depth range of a C-ToF system can be represented as $$\Gamma_{range} = \frac{c\tau_{period}}{2},$$

where $\tau_{period}$ represents the period of the modulation and demodulation functions), scene albedo $\beta_{mean}$, and sensor noise $\Omega$.

FIGS. 7A1-7F4 show examples of modulations functions, demodulation functions, correlations functions, and coding curves for different C-ToF coding schemes calculated as described above in connection with FIG. 6 in accordance with some embodiments of the disclosed subject matter. The coding curves described below are calculated assuming that the total source power $M_{total}$ (area under the curve of the modulation functions), exposure time, and the unambiguous depth range are the same for all coding schemes.

For example, for conventional K-tap sinusoid coding, which is a commonly used coding scheme in commercial C-ToF based depth cameras, both the modulation and demodulation functions are sinusoids of the same frequency as shown in FIGS. 7A1 and 7A2:

$$M_i(t) = 0.5 + 0.5\cos(\omega t)$$

$$D_i(t) = 0.5 + 0.5\cos\left(\omega t - \frac{2i\pi}{K}\right), 1 \le i \le K$$

K-tap can indicate that K measurements are captured, with the demodulation function phase-shifted (typically by an equal amount $$\frac{2\pi}{K})$$

between successive measurements, while the modulation function remains the same. Note that the modulation function is normalized so that the area under the curve (for every period) is equal to $\pi$. After substituting these in Equation 4, and simplifying, the expression for the normalized correlation functions can be represented as:

$$\mathcal{F}_i(\Gamma) = 0.5 + 0.25\cos\left(\frac{2\omega\Gamma}{c} - \frac{2i\pi}{K}\right) \quad (18)$$

The coding curve length for sinusoid coding can be derived algebraically and/or geometrically. For example, deriving the coding length algebraically, as described above in connection with Equation 16, the coding curve length is defined in terms of the derivatives of the correlation functions. Accordingly, taking the derivative of Equation 18 with respect to depths $\Gamma$:

$$\mathcal{F}'_i(\Gamma) = -0.25\left(\frac{2\omega}{c}\right)\sin\left(\frac{2\omega\Gamma}{c} - \frac{2i\pi}{K}\right)$$

After substituting the above into Equation 16, and simplifying, the coding curve length of sinusoid coding can be represented as:

$$\boxed{\mathcal{L}_{curve}^{sin} = \frac{\pi}{2}\sqrt{\frac{K}{2}}} \quad (19)$$

Deriving the coding geometrically, the coding curve for sinusoid coding (i.e., the locus of points $[\mathcal{F}_1(\Gamma), \ldots, \mathcal{F}_K(\Gamma)]$, as $\Gamma$ is varied), can be represented by a circle in K-dimensional space. The center of the circle is the point $\mathbf{C} = (0.5, 0.5, \ldots, 0.5)$. The radius of the circle is $$\text{rad}(K) = \frac{\sqrt{K}}{4\sqrt{2}}.$$

The coding curve length is $$\mathcal{L}_{curve}^{sin} = 2\pi \text{ rad}(K) = \frac{\pi}{2}\sqrt{\frac{K}{2}}.$$

This is consistent with the algebraic derivation described above.

As another example, a conventional square wave coding scheme uses square waves instead of sinusoids for both modulation and demodulation functions:

$$M_i(t) = 0.5 + 0.5\, sqr(\omega t)$$

$$D_i(t) = 0.5 + 0.5\, sqr\left(\omega t - \frac{2i\pi}{K}\right), 1 \leq i \leq K$$

where the sqr(t) function is the binary version of the sin(t) function:

$$sqr(t) = \begin{cases} 1 & \text{if } \sin(t) > 0 \\ -1 & \text{if } \sin(t) < 0 \end{cases}$$

In this example, the correlation of two square functions is a triangle function. Accordingly, the normalized correlation function for square coding can be represented as:

$$\mathcal{F}_i(\Gamma) = 0.5 + tri\left(\frac{2\omega\Gamma}{c} - \frac{2i\pi}{K}\right),$$

where the tri(t) function is shown in FIG. 7B3 in connection with the square coding scheme.

Note that, in this example, due to the piecewise linear nature of the correlation functions in the square coding scheme, the coding curve is a non-planar polygon in K-dimensional space, as shown in FIG. 7B4. The centroid of the polygon is the point (0.5, . . . , 0.5). The polygon has 2K sides, each with length $$sideLength(K) = \frac{1}{\sqrt{K}}.$$

The total length of the coding curve can be represented as:

$$\mathcal{L}_{curve}^{sqr} = 2\sqrt{K} \qquad (20)$$

Comparing Equations 19 and 20, the coding curve length of square coding is $$\frac{4\sqrt{2}}{\pi} \approx 1.8$$

times that of conventional sinusoid coding, for any K. Accordingly, this suggests that given the same scene and system characteristics, square coding should achieve approximately 1.8 times higher precision (i.e., lower error) as compared to sinusoid coding.

The coding curve representation can be used to analyze the entire space of valid C-ToF coding schemes. Other examples of coding curves are shown in FIGS. 7A1-7F4, such as ramp coding (also sometimes referred to as the "light wall" scheme) where one of the correlation functions is a ramp and the other two are constant, double-ramp coding where two correlation functions are opposing ramps, and impulse sinusoid coding where the demodulation functions are sinusoids (i.e., the same as conventional sinusoid coding), but the modulation function is an impulse train function. The coding curve lengths for these schemes are also shown in Table 1, below.

TABLE 1

| Coding Scheme | Coding Curve | Curve Length | Curve Length (K = 3) | Curve Length (K = 4) | Curve Length (K = 5) |
|---|---|---|---|---|---|
| Single Ramp | Edge of 3D unit Cube | 1 | 1.00 | — | — |
| Double Ramp | Face diagonal of 3D unit cube | $\sqrt{2}$ | 1.41 | — | — |
| Sinusoid | Circle of radius $\frac{\sqrt{K}}{2\sqrt{2}}$ | $\frac{\pi}{2}\sqrt{K/2}$ | 1.92 | 2.22 | 2.48 |
| Square | Regular non-planar (2K)-gon | $2\sqrt{K}$ | 3.46 | 4.00 | 4.47 |
| Impulse Sinusoid | Circle of radius $\frac{\sqrt{K}}{2\sqrt{2}}$ | $\pi\sqrt{K/2}$ | 3.84 | 4.44 | 4.96 |
| Hamiltonian | Hamiltonian cycle on unit hypercube | $2^K - 2$ (K is odd) $2^K - 4$ (K is even) | 6.00 | 12.00 | 30.00 |

In some embodiments, the coding curve of a Hamiltonian coding scheme is a Hamiltonian cycle on the reduced hypercube graph $\mathcal{Q}_K-[0_K, 1_K]$, whose length is equal to the number of cube vertices that the cycle traverses (e.g., $2^K-2$ if K is odd, and $2^K-4$, if K is even). Thus, the coding curve length can be represented as:

$$\mathcal{L}_{curve}^{hamilt} = \begin{cases} 2^K - 2 & \text{if K is odd} \\ 2^K - 4 & \text{if K is even} \end{cases} \quad (21)$$

Comparing equation 21 to the curve lengths shown in Table 1, the coding curve length for a Hamiltonian scheme increases exponentially as a function of K, whereas for existing schemes such as sinusoid and square coding, the curve length is proportional to K. Accordingly, even for relatively small K, such as K=5, the curve length for Hamiltonian coding schemes is an order of magnitude more than conventional sinusoid coding.

In some embodiments, Hamiltonian coding schemes exhibit similar properties to the properties of Gray codes. In general, Gray codes are a sequence of binary codes configured such that two successive codes differ only in a single bit location, i.e., the Hamming distance between two adjacent codes is 1. This property makes Gray codes robust to noise. For example, if a sequence of Gray codes is used to transmit information and a small number of bits get corrupted (e.g., due to noise in a communication channel), the information can still be recovered with minimal errors. Gray codes are used in a variety of applications, such as digital communication, circuit design, and structured light 3D scanning.

Hamiltonian cycles on hypercube graphs can be related to the theory of Gray codes, as there is a one-to-one correspondence between the set of K-bit Gray codes and the set of Hamiltonian cycles on the hypercube graphs $\mathcal{Q}_K$. The Hamiltonian coding curves described herein in connection with Hamiltonian coding schemes can be considered a continuous version of discrete Gray codes, and thus can exhibit similar robustness-to-noise properties of Gray codes.

In some embodiments, source modulation functions $M_i(t)$, ($0 \leq M_i(t) \leq M_0$) and demodulation functions $D_i(t)$, ($0 \leq D_i(t) \leq 1$) can be determined such that their normalized correlation (i.e., using Equation 4) is equal to the Hamiltonian functions $\text{hamilt}_{K,i}(\Gamma)$:

$$\frac{\int_0^\tau D_i(t) M_i\left(t - \frac{2\Gamma}{c}\right) dt}{M_{total}} = \text{hamilt}_{K,i}(\Gamma), \quad 1 \leq i \leq K, \quad (22)$$

where $M_{total} = \int_0^\tau M_i(t) dt$ is the total energy emitted by the source during integration time $\tau$.

In the relationship below, $h_{K,i}[j]$, $1 \leq j \leq N$ is a vector representing the discrete sampled version (with N equi-spaced samples) of the function $\text{hamilt}_{K,i}(\Gamma)$. Similarly, $m_i[j]$ and $d_i[j]$ are discrete representations of the functions $M_i(t)$ and $D_i(t)$. Using these representations, the above system of equations and inequations can be written in matrix form as:

find $(m_i, d_i)$ such that $\frac{1}{M_{total}} C_{m_1} d_i = h_{K,i}, \sum_{j=1}^{N} m_i[j] \leq M_{total}$ $0 \leq m_i[k] \leq M_0, 0 \leq d_i[k] \leq 1, 1 \leq k \leq N$ where $C_m$ is the N×N circulant matrix constructed from the vector m. Since the equation contains a product of the unknowns $m_i$, $d_i$, this is a non-linear problem, and in general, may not have a feasible solution. However, in some embodiments in which a light source with large peak instantaneous power (e.g., $M_0 \geq M_{total}$), the above relationship can be solved using the following: $m_i = [M_{total}, 0, 0, \ldots, 0]$ (so that $C_{m_i} = M_{total} I$, where I is an identity matrix), and $d_i = h_{K,i}$. This solution corresponds to using a normalized impulse train function $\Lambda(\omega t)$ (e.g., as described above in connection with FIGS. 2 and 3, and as shown in FIGS. 7E1 and 7F1 in connection with Delta Sinusoid coding and Hamiltonian coding) as the modulation function, and the correlation function can be used as the demodulation function:

$M_i(t) = \Lambda(\omega t)$ $D_i(t) = \text{hamilt}_{K,i}(\omega t), 1 \leq i \leq K$ In some embodiments, an impulse train modulation function can be used to modulate light sources with relatively large peak power (but potentially relatively low average power). For example, as described above in connection with FIG. 1, light source 102 can be implemented using one or more laser diodes which can be modulated by the impulse train functions $\Lambda(\omega t)$. For FIG. 7F1, the function $\Lambda(\omega t)$ can be normalized so that the area under the curve (i.e., total emitted energy) is the same as that of modulation functions for other schemes (e.g., sine and square) to provide comparable systems. Note that the combination of an impulse train as the modulation function and the correlation function as a demodulation function is given as an example, and there are other combinations of modulation and demodulation functions that can result in Hamiltonian correlation functions. Additionally, in some embodiments, each modulation function and/or demodulation function may have a different profile within the time period $\tau$.

In some embodiments, such as cases in which light sources with a limited instantaneous power (e.g., $M_0 < M_{total}$), or limited frequency bandwidth of modulation and demodulation functions, the above decomposition problem may become infeasible. In some such embodiments, the system can be solved as an optimization problem with the goal of finding $(m_i, d_i)$ that satisfy the physical constraints imposed by the hardware, while minimizing the error $$\left\| \frac{1}{M_{total}} C_{m_i} d_i - h_{K,i} \right\|.$$

In some embodiments, the depth in a scene can be determined based on multiple measurements of modulated light captured using the modulated image sensor. For example, for any coding scheme, points on the coding curve $F(\Gamma) = [\mathcal{F}_1(\Gamma), \mathcal{F}_2(\Gamma), \ldots, \mathcal{F}_K(\Gamma)]$ are parameterized by the depth value $\Gamma$ such that there is a one-to-one mapping between $\Gamma$ and points $F(\Gamma)$. Thus, given the measurement point $B = [B_1, \ldots, B_K]$, depth $\Gamma$ can be estimated by determining the corresponding coding curve point $F(\Gamma)$. From the image formation equation (e.g., Equation 5):

$$B = \beta F(\Gamma) + A \rightarrow F(\Gamma) = \frac{B - A}{\beta}, \quad (23)$$

where $\beta$ and A are also unknown. In order to determine $F(\Gamma)$ from measurements B, $\beta$ and A can be estimated.

As described above, the Hamiltonian coding curve can follow the edges of a unit cube. Considering a coding curve point F(Γ) lies on an edge between cube vertices $V_l=[V_{l,1}, \ldots, V_{l,K}]$ and $V_r=[V_{r,1}, \ldots, V_{r,K}]$, the coordinates of $V_l$ and $V_r$ are binary (0 or 1), and differ along only one index μ (i.e., $V_{l,\mu} \neq V_{r,\mu}$). In such an example, the coding curve point is given as $F(\Gamma)=\alpha V_l+(1-\alpha)V_r$, where $0 \leq \alpha \leq 1$ encodes the location of F(Γ) along the edge between $V_l$ and $V_r$. Note that for every Γ, $\mathcal{F}_{min}$ and $\mathcal{F}_{max}$, the minimum and maximum coordinates of the coding point F(Γ), are 0 and 1, respectively. The expressions $B_{min}=\beta \mathcal{F}_{min}+A$ and $B_{max}=\beta \mathcal{F}_{max}+A$ can represent the minimum and maximum measured intensities, respectively. Since $\mathcal{F}_{min}=0$ and $\mathcal{F}_{max}=1$, these expressions can be simplified as $B_{min}=A$ and $B_{max}=\beta+A$. Thus, we can estimate β and A as $A=B_{min}$ and $\beta=B_{max}-B_{min}$, where $B_{min}=\min([B_1, \ldots, B_K])$ and $B_{max}=\max([B_1, \ldots, B_K])$ can be computed from the measurements B. Once β and A are estimated, the coding point F(Γ) can be determined using Equation 23, from which, as described above, depth can be estimated. Note that, in some embodiments, the correlation functions may depart from a strict correspondence to Hamiltonian cycles on a hypercube, while still retaining many of advantages provided by using a Hamiltonian coding scheme. For example, the coding curve may curve at one or more vertices of the hypercube, which shortens the length of the coding curve slightly while still providing a coding curve that is significantly longer than the coding curves of sinusoid and square coding schemes. Other coding schemes with relatively long coding curves (e.g., longer than the coding curves produced by sinusoid or square coding with K=5 or higher) can be used to calculate a combination of modulation and demodulation functions that produce correlation functions corresponding to the coding curve.

Figure 8:
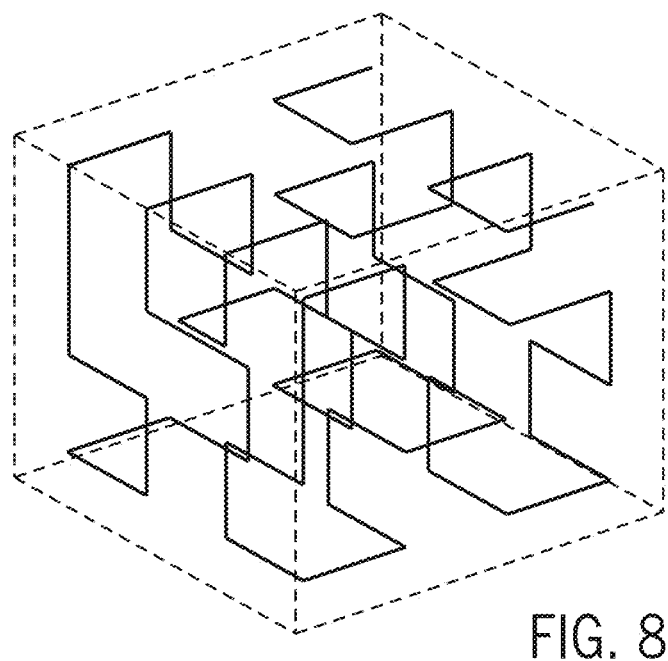
FIG. 8 shows an example of the coding curve for a Hilbert coding scheme of order 2 in accordance with some embodiments of the disclosed subject matter.

FIG. 8 shows an example of the coding curve for a Hilbert coding scheme of order 2 in accordance with some embodiments of the disclosed subject matter. Although Hamiltonian coding schemes achieve substantial improvement over existing techniques other coding schemes may achieve better performance than Hamiltonian coding. For example, coding schemes based on the family of space filling Hilbert curves may exhibit properties that can lead to high precision under certain conditions. Due to their space-filling properties, Hilbert curves can theoretically have infinite path length. However, Hilbert curves lack other properties that can be useful for C-ToF coding curves. For example, Hilbert coding curves have many sharp turns that manifest in poor locality preserving properties. Consequently, even small image noise can result in large depth errors. Hamiltonian coding, given its strong locality properties, may outperform Hilbert coding in many real-world scenarios, however, in specific situations (e.g., very low noise), Hilbert coding may achieve better performance.

As described above in connection with Equation 16, the depth precision achieved by a coding scheme is proportional to its coding curve length. Accordingly, C-ToF coding schemes based on space-filling curves (e.g., Hilbert curves), which are 1D curves that pass through points inside a unit K-dimensional cube, by increasing the coding curve length may increase the depth precision that can be achieved by the coding scheme.

Due to their space-filling properties, Hilbert curves can be designed with potentially infinite length, which would appear to correspond to a coding scheme (based on Hilbert curves) that can potentially achieve infinite precision, which is not physically possible. Because the derivation described above is based on local differential analysis implicitly using the first order Taylor series expansion, the depth derivatives of intensities $$\frac{\partial B}{\partial \Gamma}$$

should be well-defined and relatively small. However, higher order Hilbert curves (e.g., as shown in FIG. 8) have several folds and sharp turns. For such curves, the intensity gradients $$\frac{\partial B}{\partial \Gamma}$$

cannot be assumed to be continuous.

In general, large intensity gradients manifest in poor locality preserving properties of higher order Hilbert curves. That is, there are points on Hilbert curves that are distant from each other along the curve, but the Euclidean distance between them is small. Consequently, even small image noise can potentially result in large errors in the estimated depth. While lower order Hilbert curves have good locality preserving properties and can potentially achieve higher precision as compared to Hamiltonian coding, higher order Hilbert curves, despite being considerably longer than Hamiltonian curves, in general, may achieve lower precision (e.g., due to larger errors).

Figure 9:
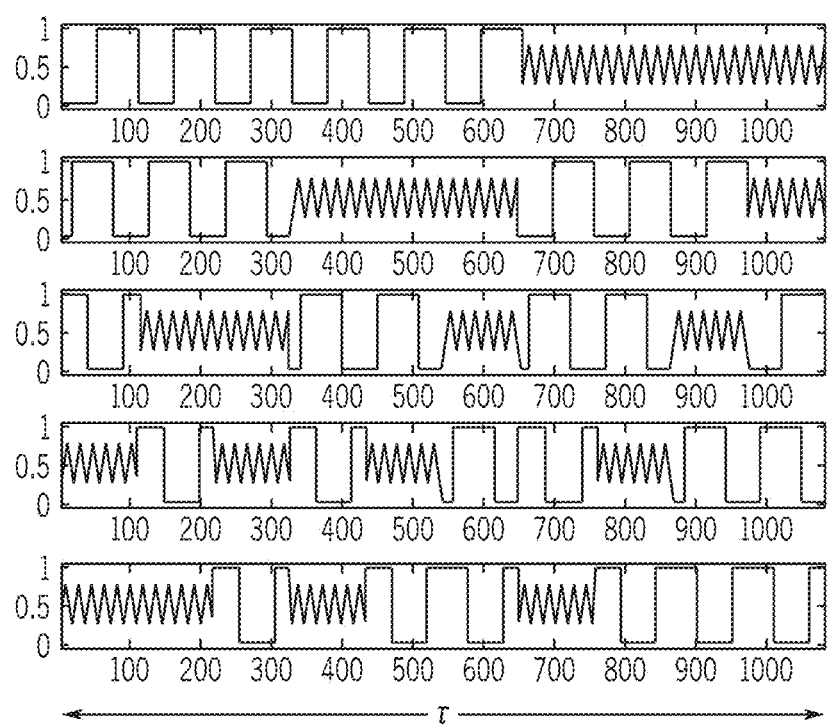
FIG. 9 shows an example of correlation functions based on the Hilbert curve shown in FIG. 8 in accordance with some embodiments of the disclosed subject matter.

Another practical constraint in implementation of Hilbert coding is that large bandwidths may be required for producing the demodulation function. For example, FIG. 9 shows an example of correlation functions based on the Hilbert curve shown in FIG. 8 in accordance with some embodiments of the disclosed subject matter. More particularly, a Hilbert coding functions $hilb_{K,o,i}(t)$ for K=5 and o=2, where $hilb_{K,o,i}(t)$ is defined as the value of the $i^{th}$ coordinate of points on a K-dimensional Hilbert curve of order o is shown in FIG. 9. As can be appreciated by comparison of FIG. 9 to FIGS. 2, 3 and 11 (described below), Hilbert functions have significantly higher frequency bandwidth as compared to Hamiltonian functions, thus potentially requiring more complex hardware. Overall, Hamiltonian coding, given its large coding curve length, strong locality properties and ease of practical implementation, may produce more precise depth estimates in most real-world scenarios. In specific situations (e.g., very low noise), Hilbert coding can achieve better performance, given availability of appropriate hardware devices (e.g., high frequency sensor demodulation).

Figure 10:
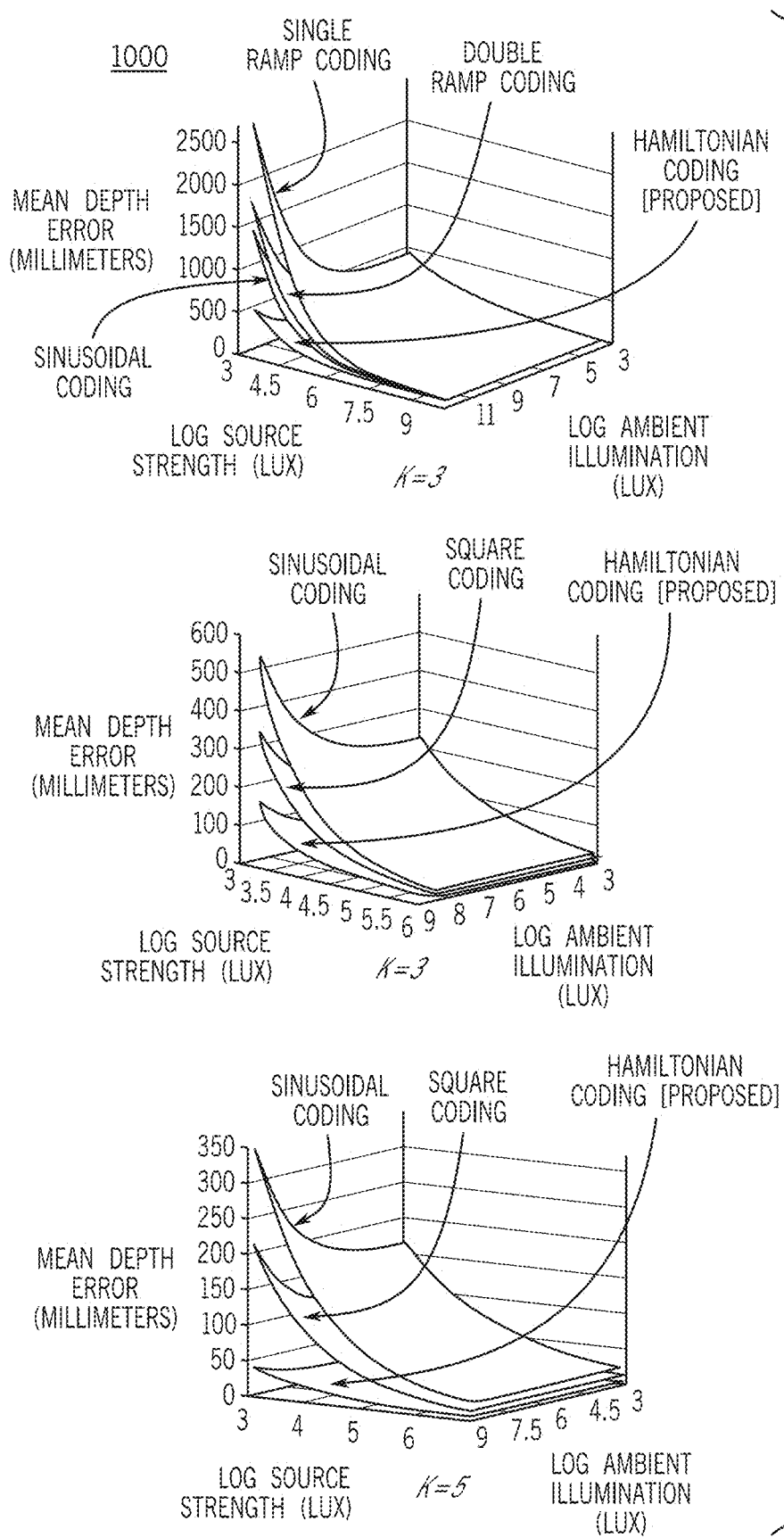
FIG. 10 shows examples of mean depth error for various coding schemes under different source strength and ambient light conditions in accordance with some embodiments.

FIG. 10 shows examples 1000 of mean depth error for various coding schemes under different source strength and ambient light conditions in accordance with some embodiments. As described above in connection with Equation 9, the mean expected depth error $\overline{\Delta\Gamma_c}$ is a global measure of the performance of a C-ToF coding scheme $c$. In some embodiments, various coding schemes can be compared by numerically computing their mean expected depth errors by discretizing the unknown and measurement spaces described in connection with FIG. 6. To calculate the mean expected depth area at each space, a physically accurate simulator can be used to evaluate the performance of C-ToF coding schemes. Additionally or alternatively, a hardware system that can implement various coding schemes can be used to compare the properties of various coding schemes.

In some embodiments, an adaptive grid technique can be used to numerically calculate the mean expected depth error $\overline{\Delta\Gamma_c}$ for various coding schemes using any suitable parameters. For example, the following parameters can be used. Scene depth range can be set to: $\Gamma_{min}=0$, $\Gamma_{max}=10$ meters. Image noise can be Gaussian noise, with affine noise model including photon noise and sensor read noise of 20 electrons. Sensor integration time can be set to: 10 milliseconds. Scene reflectivity can be set to: Lambertian BRDF, albedo of 0-1. As shown in FIG. 10, the mean depth error for various coding schemes for K=3, 4, 5, as a function of the light source and ambient illumination strengths can be compared. In the examples of FIG. 10, mean expected depth error $\overline{\Delta\Gamma_c}$ is calculated for a point light source with average strengths in the range of ~10-1000 lumens, while ambient light was assumed to be uniform over the scene, with strengths in the range of 10-10,000 lux. As expected (e.g., from Equation 17), for every coding scheme, the depth error decreases rapidly as the source strength increases, and increases as ambient illumination increases. As shown in FIG. 10, Hamiltonian coding schemes significantly outperform existing methods across all settings, especially as K increases. From the values represented in FIG. 8, the ratio of depth errors between two coding schemes is approximately the same as the ratio of their inverse coding curve lengths. For example, for K=5, the ratio $$\frac{\overline{\Delta\Gamma_{sin}}}{\overline{\Delta\Gamma_{hamilt}}} \approx 10,$$

which is approximately the same as the ratio of inverse coding curve lengths for the two schemes (e.g., 30/2.48 from Table 1).

In some embodiments, the simulator for C-ToF imaging can emulate any valid coding scheme, under a wide range of scene configurations (e.g., different geometries and reflectance properties) and sensor-source parameters (e.g., quantization, pixel size, focal length, zoom, source brightness and modulation frequencies). For example, the simulator can model different steps of the image formation process, including light emission and propagation, reflection, sensor demodulation and radiometric transformations (gain, saturation, quantization) and noise (photon and read noise).

Figure 11:
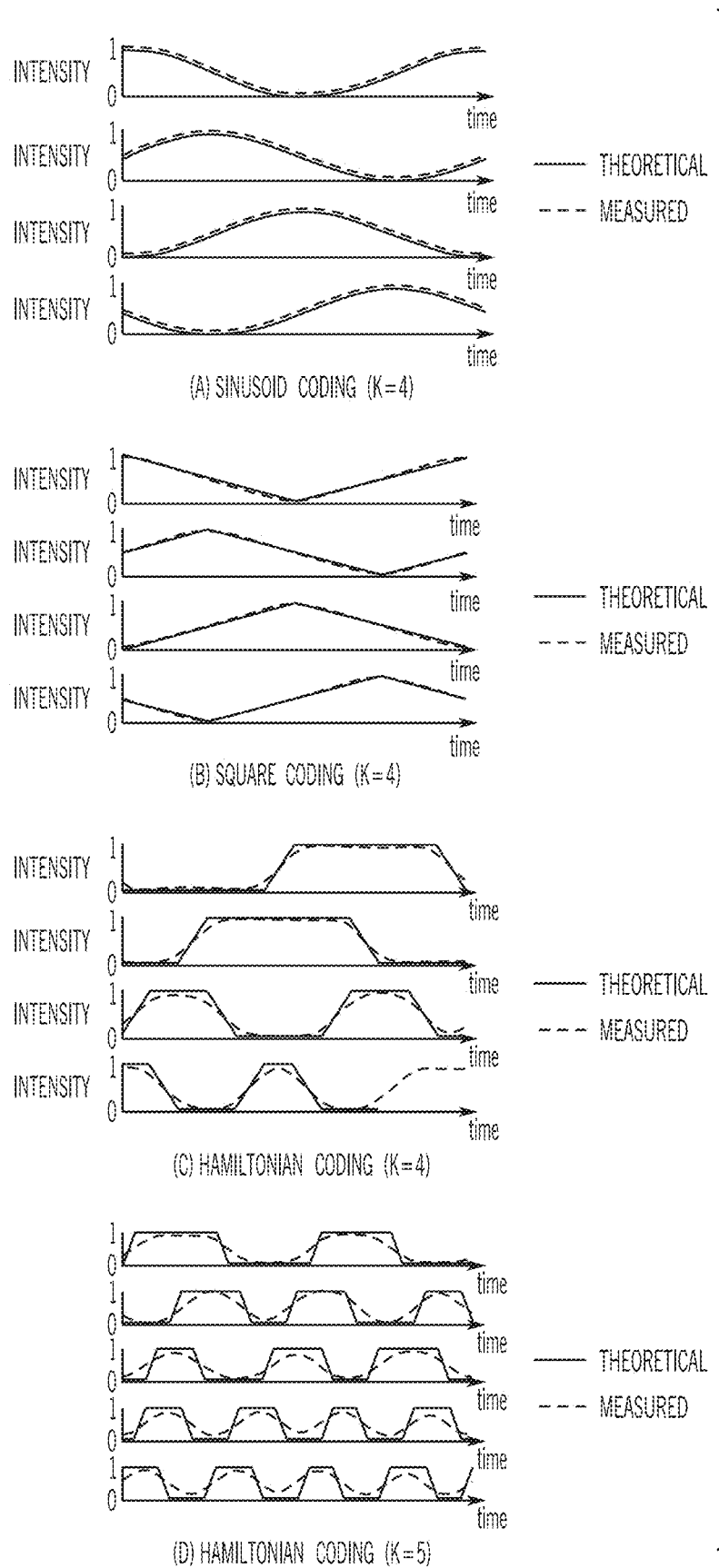
FIG. 11 shows examples of correlation functions for various coding schemes and measured correlation functions for those coding schemes in accordance with some embodiments of the disclosed subject matter.

FIG. 11 shows examples of correlation functions for various coding schemes and measured correlation functions for those coding schemes in accordance with some embodiments of the disclosed subject matter. In some embodiments, a hardware system that can implement various coding schemes can be used to evaluate different C-ToF coding schemes. For example, such a hardware system can be configured as a single pixel point scanner, using an 830 nm laser diode (e.g., an L830P200 laser diode available from Thorlabs, Inc.) that can be modulated with arbitrary waveforms by an external signal of up to 500 MHz bandwidth. The modulation signal can be provided by a waveform generator, and amplified by an RF amplifier before being applied to the laser diode. The laser diode can be operated at ~15 mW average power, with approximately 40 times peak power (e.g., 600 mW) available, to implement impulse train modulation functions. The light emitted by the laser diode can be collimated by an aspheric lens, and passed through a pair of galvanometer steered mirrors (e.g., GV S012 available from Thorlabs, Inc.), a scan lens and an objective lens before reaching the scene. The reflected light can return to the objective lens along the same path as the illumination, and can be focused onto a photodiode (e.g., an APD210 photodiode available from Menlo Systems, Inc. of Newton, N.J.) with a bandwidth up to 1 GHz. Note that this is merely an example, and a system for testing various coding schemes can be implemented using any suitable sensor, such as a line sensor, an area sensor, etc. The electronic signal from the photodiode can multiplied inside an RF frequency mixer with a local oscillator signal (i.e., the sensor demodulation function) generated by the second channel of the waveform generator, and then integrated using a low pass filter. Finally, the signal can be digitized by an analog to digital converter (e.g., a USB-6000DAQ available from National Instruments of Austin, Tex.).

To scan the beam a second function generator can be used to generate driving voltages for the galvanometer actuated mirrors. For example, the galvanometer drivers can provide feedback signals with voltages proportional to the position of the x and y mirrors. These signals can be digitized by the DAQ unit along with each data sample. From this data, an image can be created by binning the collected data samples into a two dimensional histogram with the x and y dimensions in the scene forming the histogram axes. In a more particular example, 400 bins can be used along both axes, resulting in a spatial resolution of 400×400 pixels.

In some embodiments, the testing system described above can be implemented using only low-cost off-the-shelf components. In some such embodiments, the system bandwidth can be limited (e.g., to 160 MHz) by the waveform generator. In connection with the following results from the testing system described above, the same fundamental frequency of 10 MHz (corresponding to an unambiguous depth range of 15 meters was used for all coding schemes). Although the fundamental frequency is 10 MHz, coding functions for non-sinusoid schemes such as square and Hamiltonian contain higher frequency components. Further, the total source power used was the same for all coding schemes was verified using a light meter. As described above, FIG. 11 shows the correlation functions for various coding schemes as implemented by the testing system. Note that the measured results may be closer to the theoretical results for systems that can generate signals that more closely replicate the signals used in the coding system. For example, due to bandwidth constraints in the testing system, the light source did not emit a perfect impulse function, and the higher order Hamiltonian coding functions were low-pass filtered, resulting in loss of performance compared to the theoretical results.

Figure 12:
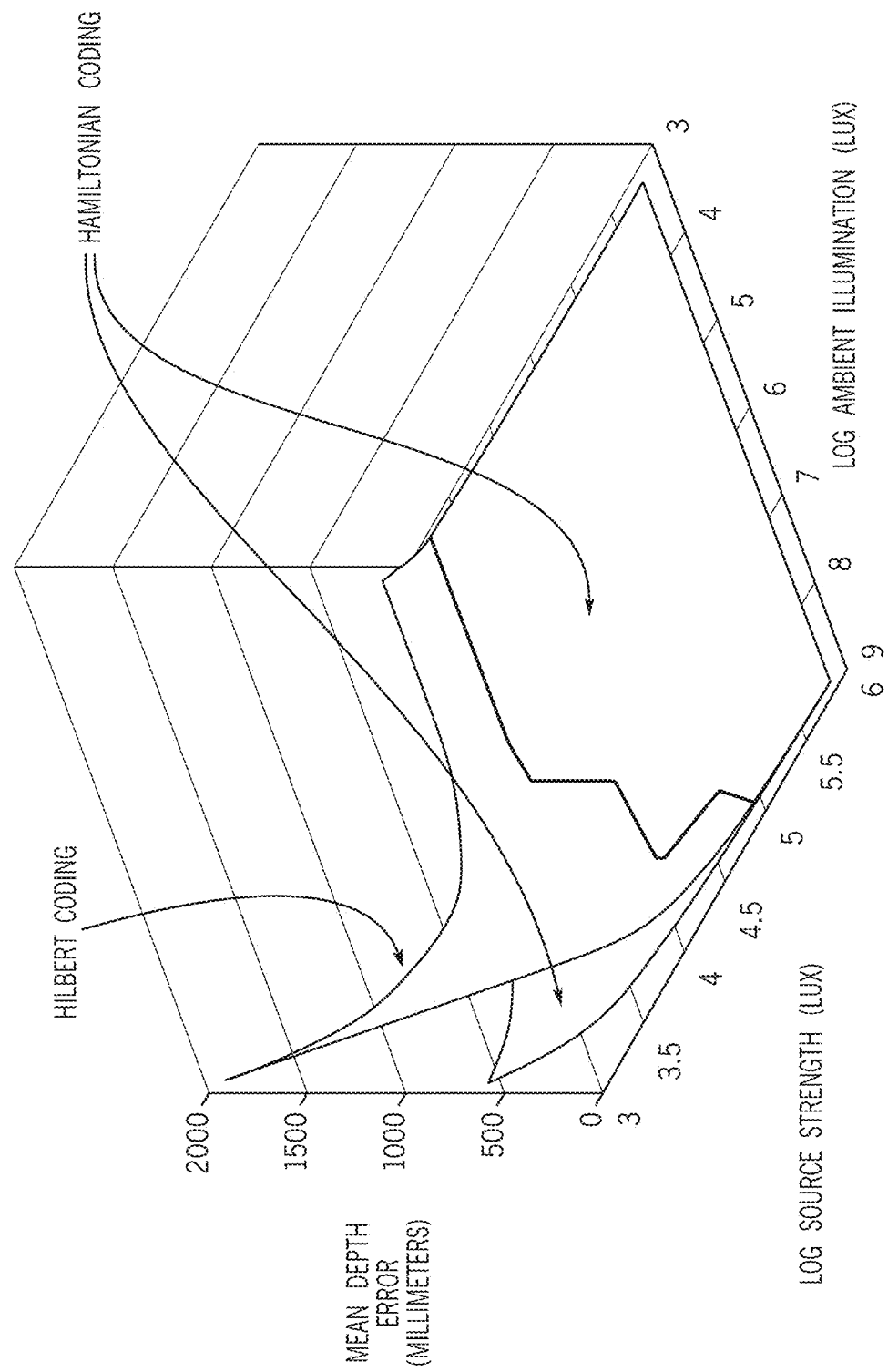
FIG. 12 shows an example of mean depth error plots comparing a Hilbert coding scheme (with the Hilbert curve in FIG. 8 as its coding curve) and Hamiltonian coding for K=5.

FIG. 12 shows an example of mean depth error plots comparing a Hilbert coding scheme (with the Hilbert curve in FIG. 8 as its coding curve) and Hamiltonian coding for K=5. As shown in FIG. 12, while Hilbert coding achieves higher performance than Hamiltonian coding in low-noise scenarios (e.g., large source strength and/or low ambient illumination), in general, Hamiltonian coding achieves superior performance.

Figure 13A:
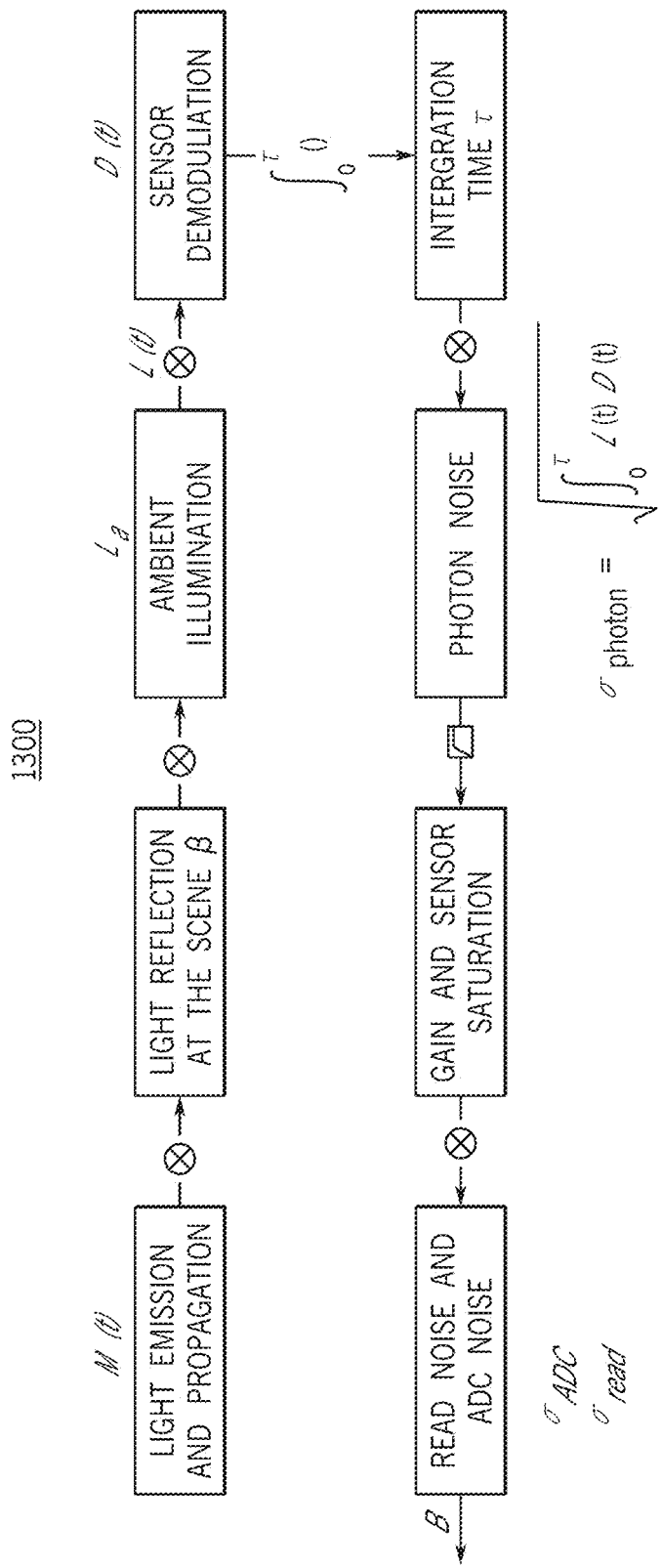
FIGS. 13A-13D show examples of an implementation of a software simulator for evaluating various coding schemes, and error results for various simulated scene configurations for different coding schemes in accordance with some embodiments of the disclosed subject matter.
Figure 13B:
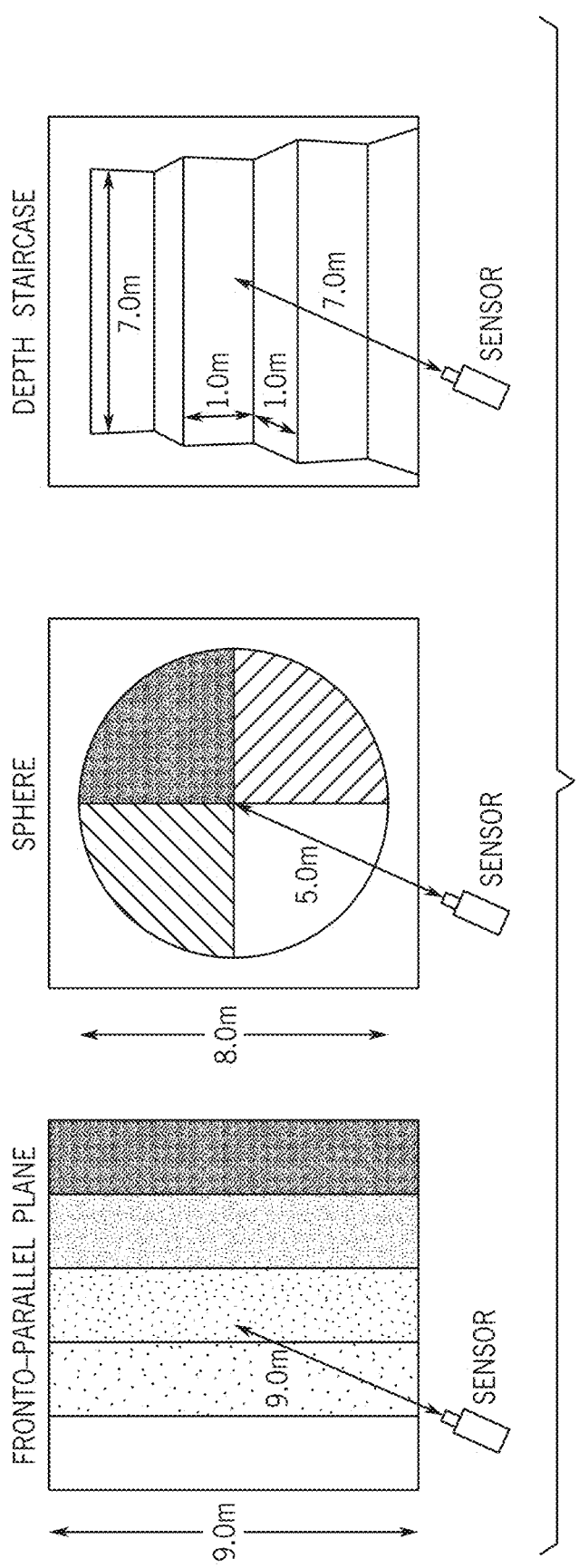
Figure 13C:
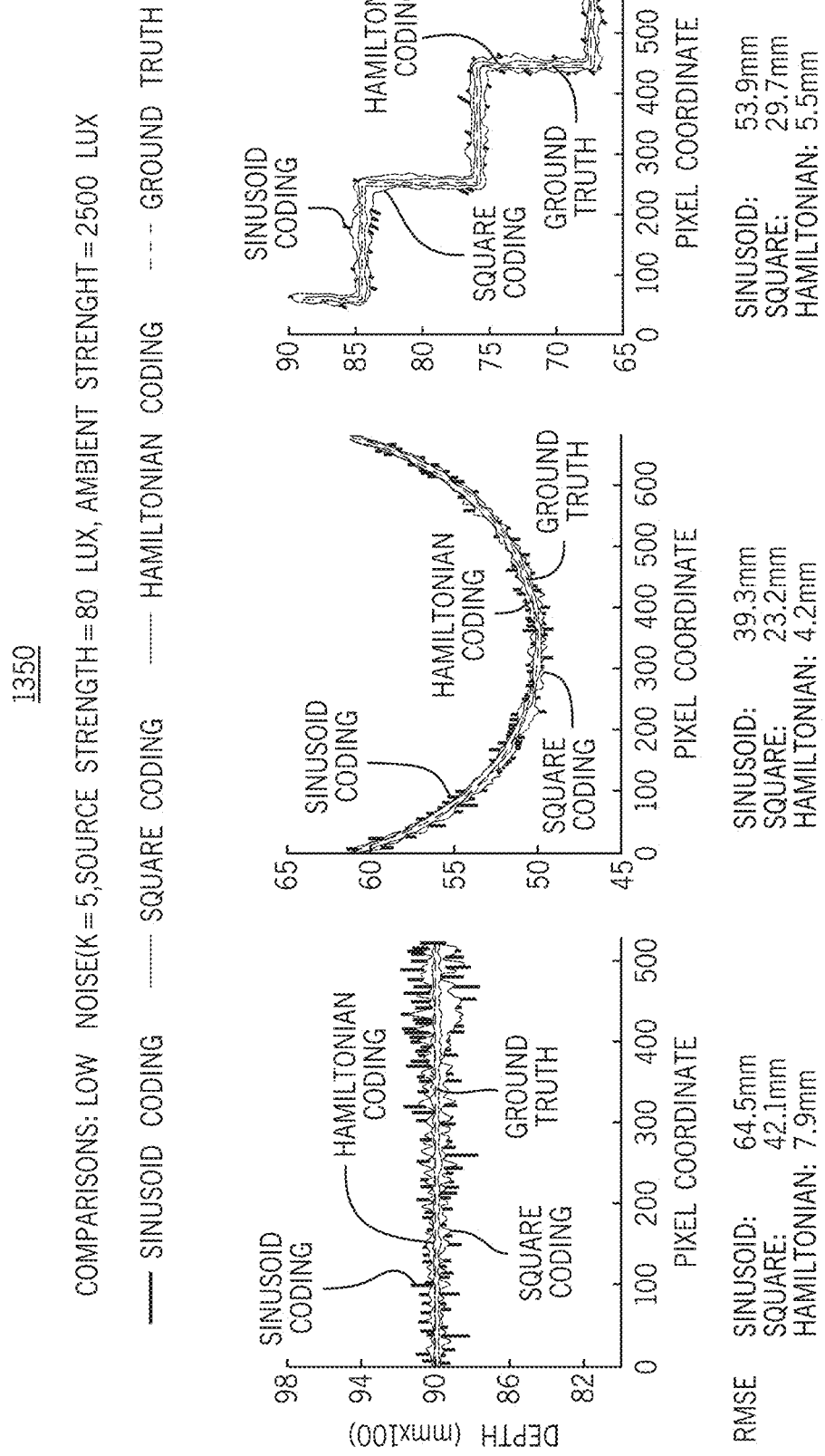
Figure 13D:
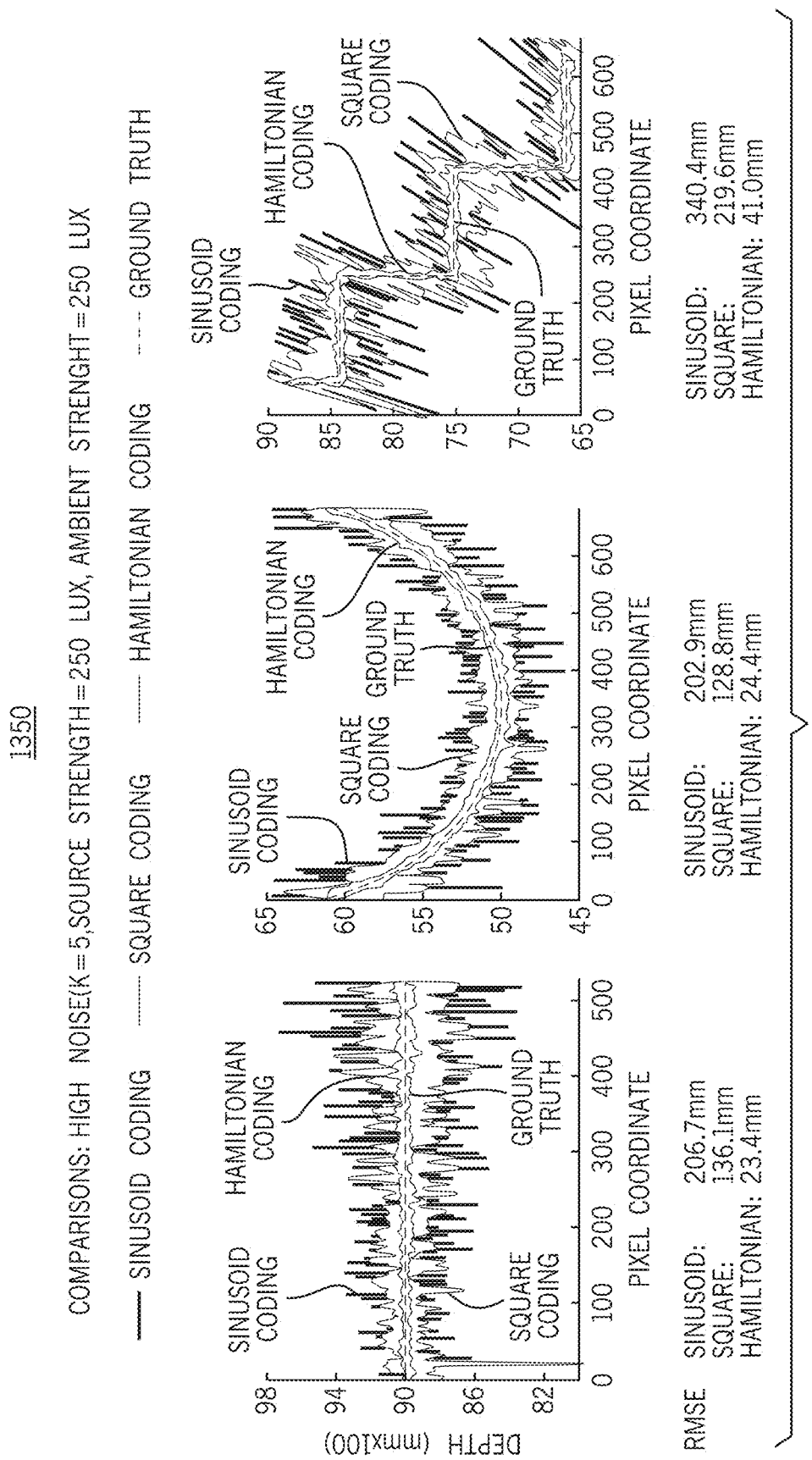

FIGS. FIGS. 13A-13D show examples of an implementation of a software simulator for evaluating various coding schemes, and error results for various simulated scene configurations for different coding schemes in accordance with some embodiments of the disclosed subject matter. In some embodiments, an example 1300 of a software simulator to test various coding schemes in accordance with the mechanisms described herein is shown in FIG. 13A, for testing various scene configurations 1310 as shown in FIG. 13B. FIGS. 13C and 13D show examples 1350 of depth recovery results for the three scene configurations 1310, and various coding schemes in a low noise setting (e.g., K=5, source strength=200 lumens, ambient strength=250 lux), and a high noise setting due to strong ambient illumination (e.g., K=5, source strength=50 lumens, ambient strength=2500 lux). The remaining imaging parameters simulated are the same as described in the previous subsection. Square coding achieved an error≈1.6 times lower than conventional sinusoid (the ratio of coding curve lengths≈1.8), while Hamiltonian coding achieved a mean depth error of about an order of magnitude lower than conventional sinusoid coding in both noise settings, consistent with the ratio of coding curve lengths.

Figure 14:
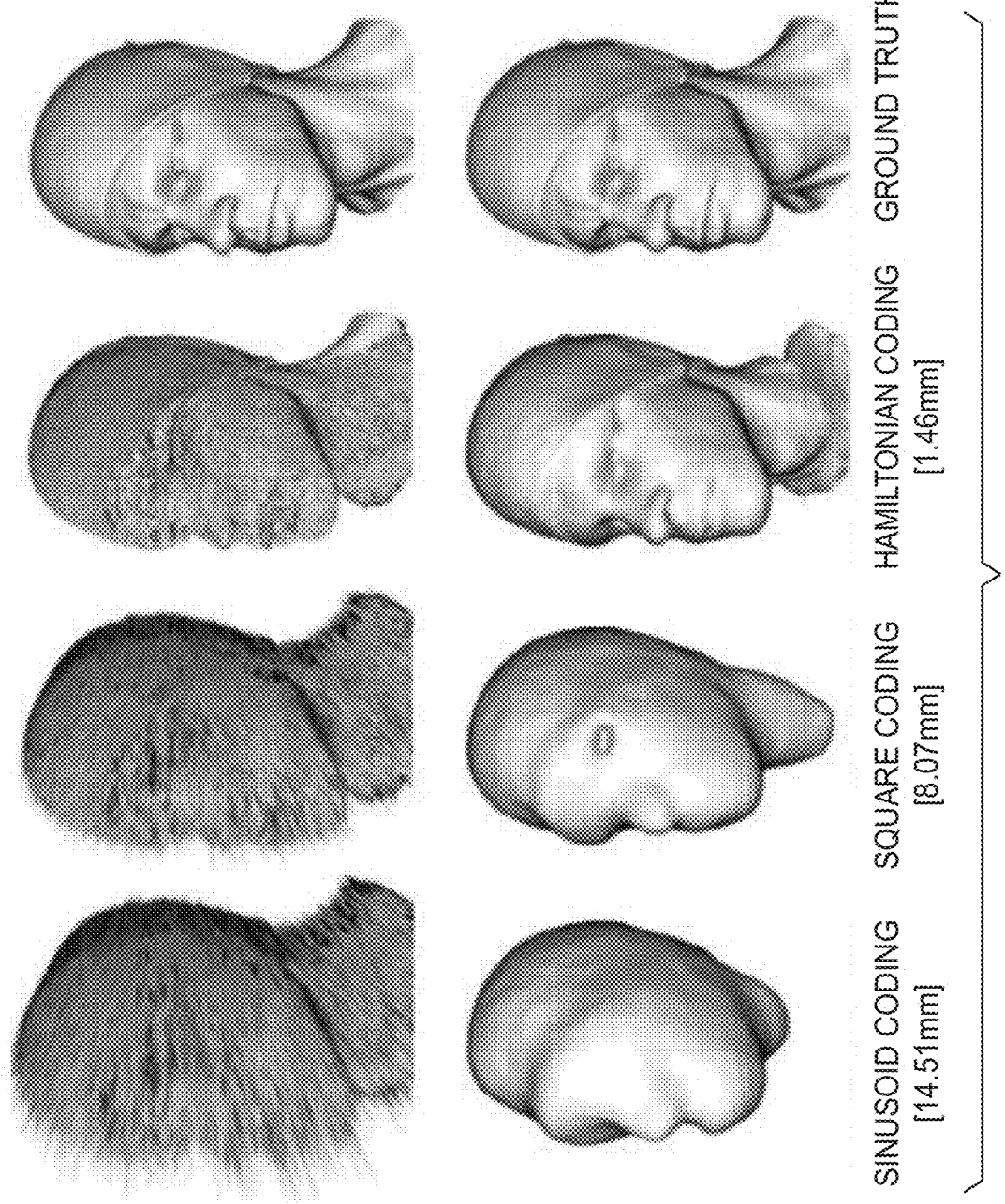
FIG. 14 shows examples of 3D imaging simulations for a face 3D model in accordance with some embodiments of the disclosed subject matter.

FIG. 14 shows examples of 3D imaging simulations for a 3D model of a face in accordance with some embodiments of the disclosed subject matter. In the examples shown in FIG. 14, the conditions were simulated as corresponding to an environment (e.g., an outdoor setting) with strong ambient light, resulting in large photon noise. As shown in FIG. 14, although the large noise in sinusoid and square reconstructions can be reduced by smoothing, the 3D details cannot be recovered, while Hamiltonian coding recovered sufficient details to potentially allow recognizing the identity of the face.

FIGS. 15A-15C show examples of a test setup and test results using a hardware testing system (e.g., as described above in connection with FIG. 11) in accordance with some embodiments of the disclosed subject matter. In the example of FIG. 15A, the imaging setup can include a single planar diffuse patch for which depth is estimated by the image sensor. The patch was placed on a translation stage and its depth was varied between 2 meters to 3 meters. The depth of the patch was estimated at several locations along the stage; at every location, the depth was estimated 104 times, and the root mean square (RMS) error was computed, as shown in FIGS. 15B and 15C, which includes plots of RMS depth errors for sinusoid, square and Hamiltonian coding, for K=4 and K=5, respectively, as a function of the depth of the patch. As shown in FIG. 15, the Hamiltonian coding scheme achieved lower depth errors as compared to existing techniques.

Figure 16A:
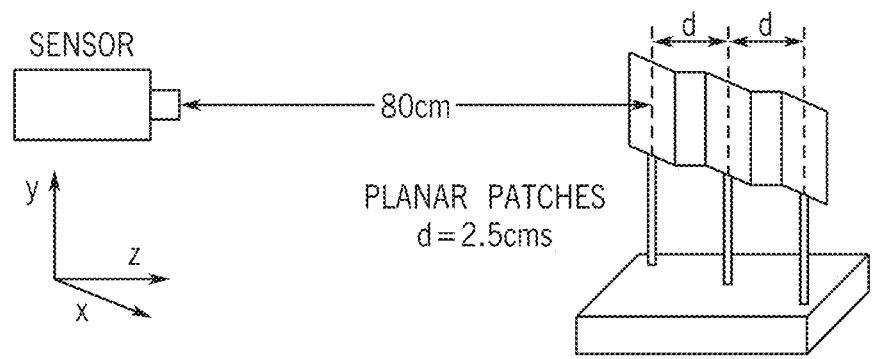
Figure 16B:
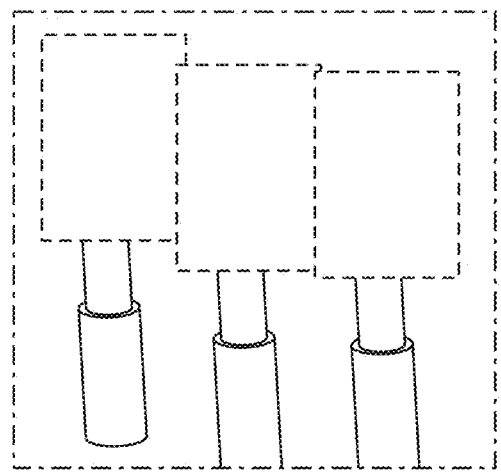
Figure 16D:
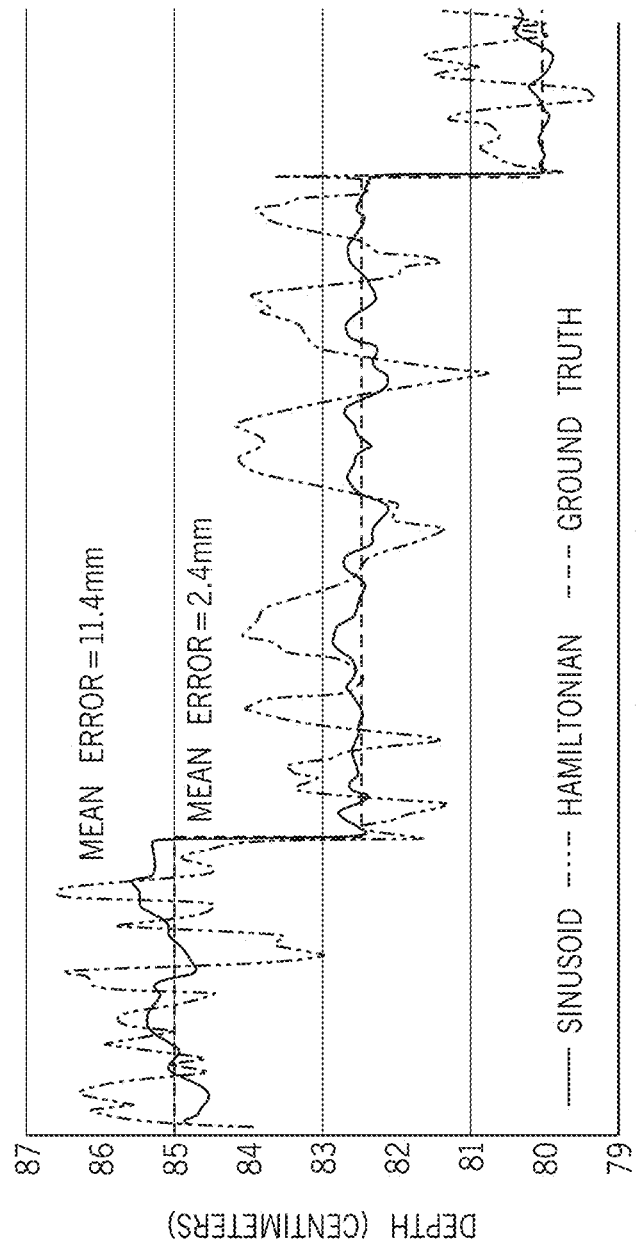

FIGS. 16A-16D show another example of a test setup and test results using a hardware testing system (e.g., as described above in connection with FIG. 11) in accordance with some embodiments of the disclosed subject matter. In the example of FIGS. 16A and 16B, the scene can include three planar patches at different depths so that they form a "depth staircase," with the distance between the patches being 2.5 cms. FIG. 16C includes a comparison of 3D reconstructions recovered using sinusoid and Hamiltonian coding, respectively using the same total exposure time and light source power for both schemes. The sinusoid reconstruction has a mean depth error of 1.14 cms. Consequently, as shown in FIG. 16C, the underlying geometry is barely discernible. In contrast, the "staircase" structure is discernable in the Hamiltonian reconstruction, which achieves approximately five times lower error as compared to sinusoid coding. FIG. 16D shows an example of the error produced by sinusoid and Hamiltonian coding, respectively, for the scene shown in FIGS. 16A and 16B.

Figure 17:
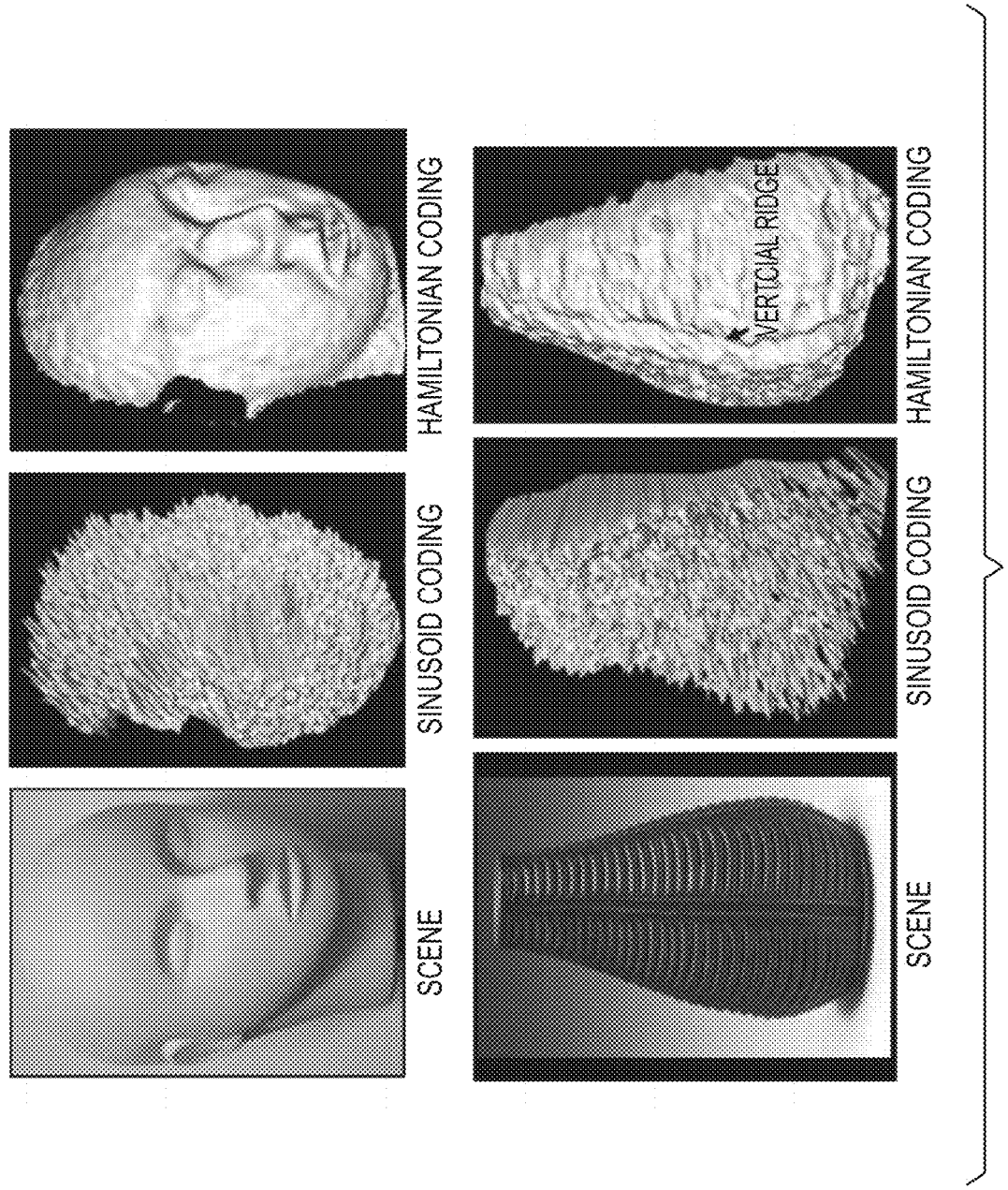
FIG. 17 shows examples of depth estimates for two different scenes captured using sinusoid and Hamiltonian coding schemes in accordance with some embodiments of the disclosed subject matter.

FIG. 17 shows examples of depth estimates for two different scenes captured using sinusoid and Hamiltonian coding schemes in accordance with some embodiments of the disclosed subject matter. As shown in FIG. 17, two low SNR scenarios were captured: a face scanned with a low-power source, and a low albedo dark object. Both objects were placed approximately 2 meters from the sensor. In both cases, sinusoid reconstructions have strong noise, resulting in large depth errors, while Hamiltonian coding is better able to recover the overall structure as well as fine details, such as lips and eyes on the face, and the vertical ridge on the vase.

Figure 18:
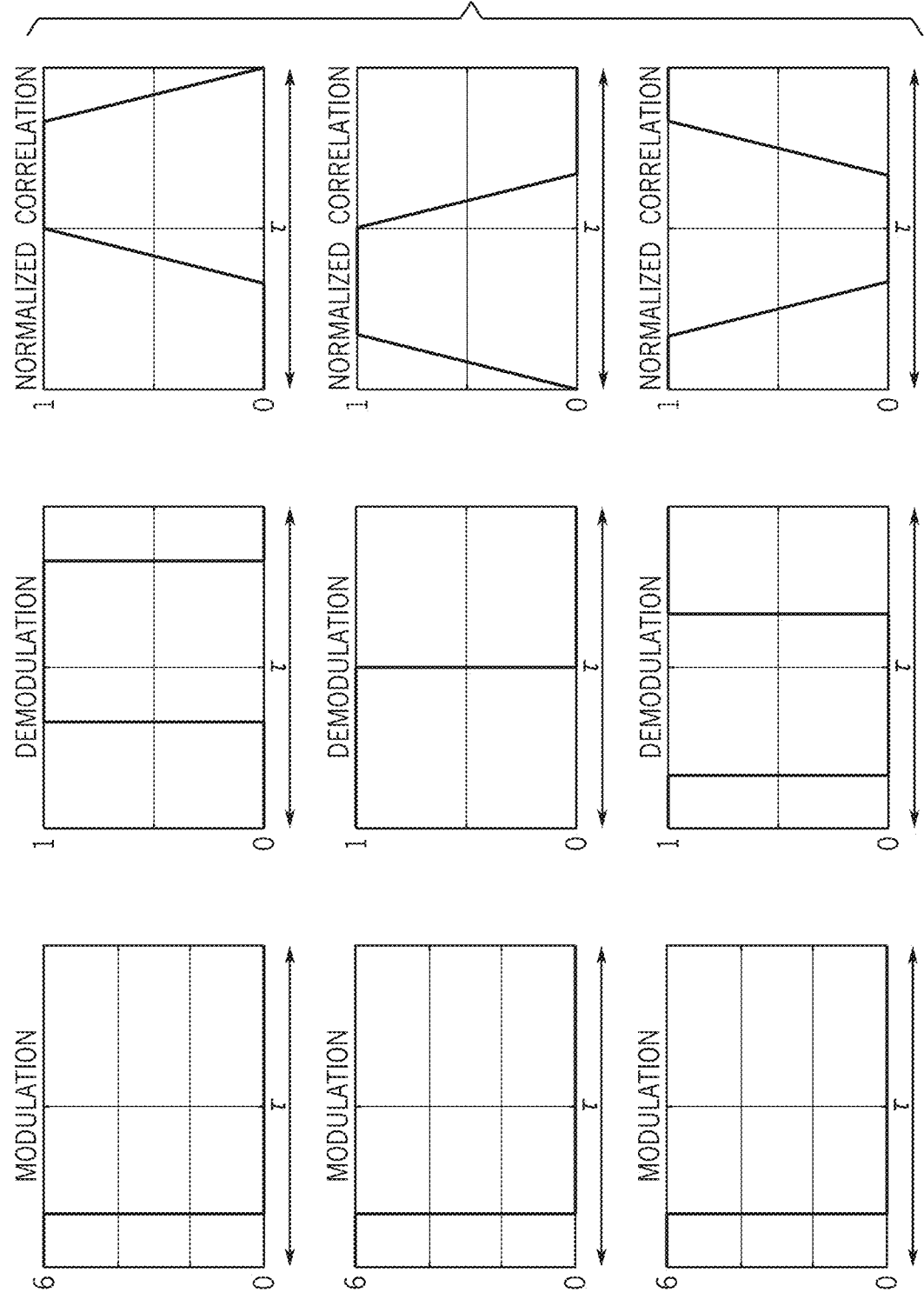
FIG. 18 shows an example of modulations functions, demodulation functions, and correlations functions that can be used for a Hamiltonian coding scheme using three measurements to estimate depth in accordance with some embodiments of the disclosed subject matter.

FIG. 18 shows an example of modulation functions, demodulation functions, and correlation functions that can be used for a Hamiltonian coding scheme using three measurements to estimate depth in accordance with some embodiments of the disclosed subject matter. As shown in FIG. 18, a set of three correlation functions that correspond to a Hamiltonian coding scheme with K=3 can be generated by an interaction between a square wave modulation function and three square wave demodulation functions. As shown in FIG. 18, the modulation signal can be a square wave that is "high" at the beginning of each integration period τ, and the demodulation signals can be applied to the image sensor (e.g., image sensor 104). In some embodiments, the period between the square wave modulation functions can be τ plus a time for reading out image data from the image sensor (e.g., as described above in connection with FIG. 2). Additionally, in some embodiments, a duty cycle of the modulation function can be ⅙ Of the integration period τ. As illustrated, each of the demodulation functions has a different profile within time period τ, but a similar combined duty cycle of about 50% (e.g., ⅜, and ⅙+⅔). As shown two of the demodulation functions can include one continuous square wave, while the third demodulation signal can include two square waves within integration period τ, the first having a duty cycle of ⅙ of integration period τ and the other having a duty cycle of ⅔ of integration period τ. In some embodiments, the modulation function and demodulation functions can be generated by a single signal generator operating in two or more different channels, or from any suitable number of signal generators. For example, the demodulation signals can be time shifted versions of the same signal produced by a single signal generator, or can be generated by different signal generators. As shown in FIG. 18, the correlation functions generated by the interaction of the modulation function and demodulation functions substantially correspond to the correlation signals generated using an impulse as the modulation function and trapezoid waves that correspond to the desired correlation function as described above in connection with FIGS. 2, 3A-3F, and 7F1-7F3. Note that the correlation functions shown in FIG. 18 are normalized, and that the intensity of light indicated by the height of the modulation function is normalized to show examples of relative intensities between schemes (e.g., to show that the relative intensity for K=3 shown in FIG. 18 is one half of the intensity for K=4, etc.), but any suitable intensity of light can be used.

Figure 19:
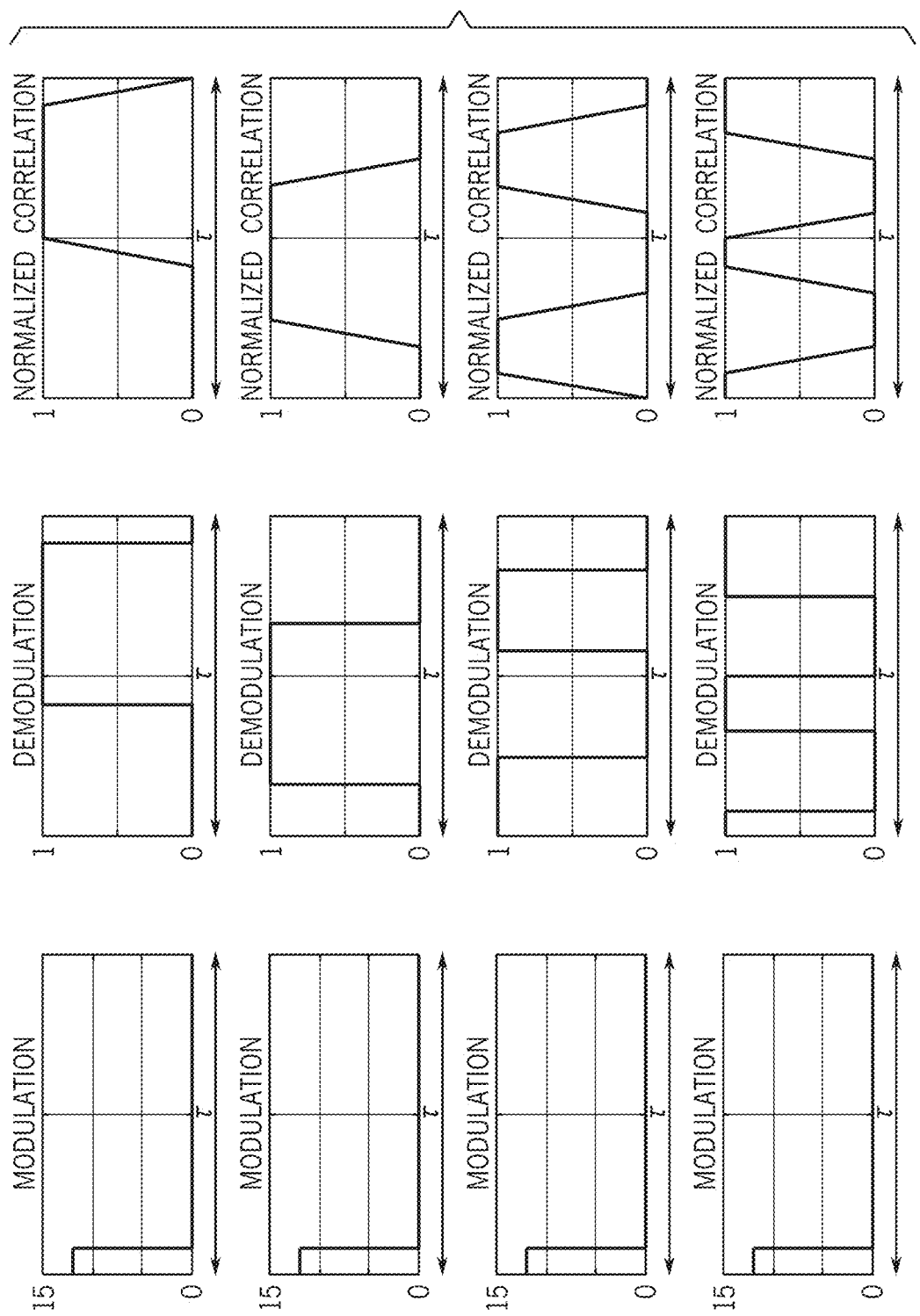
FIG. 19 shows an example of modulations functions, demodulation functions, and correlations functions that can be used for a Hamiltonian coding scheme using four measurements to estimate depth in accordance with some embodiments of the disclosed subject matter.

FIG. 19 shows an example of modulation functions, demodulation functions, and correlation functions that can be used for a Hamiltonian coding scheme using four measurements to estimate depth in accordance with some embodiments of the disclosed subject matter. As shown in FIG. 19, a set of four correlation functions that correspond to a Hamiltonian coding scheme with K=4 can be generated by an interaction between a square wave modulation function and four square wave demodulation functions. As shown in FIG. 19, the modulation signal can be a square wave that is "high" at the beginning of each integration period τ, and the demodulation signals can be applied to the image sensor (e.g., image sensor 104). In some embodiments, the period between the square wave modulation functions can be τ plus a time for reading out image data from the image sensor (e.g., as described above in connection with FIG. 2). Additionally, in some embodiments, a duty cycle of the modulation function can be $1/12$ of the integration period $\tau$. As illustrated, each of the demodulation functions has a different profile within time period $\tau$, but a similar combined duty cycle of about 50% (e.g., $6/12$, $3/12+3/12$, and $1/12+2/12+3/12$). As shown, two of the demodulation functions can include one continuous square wave, while a third demodulation signal can include two square waves within integration period $\tau$, each having a duty cycle of $3/12$ of integration period $\tau$. A fourth demodulation signal in FIG. 19 can include three square waves within integration period $\tau$, having duty cycles of $1/12$, $2/12$, and $3/12$, respectively. In some embodiments, the modulation function and demodulation functions can be generated by a single signal generator operating in several different channels, or from any suitable number of signal generators. For example, the demodulation signals can be generated by a signal generator controlled to emit various modulation and/or demodulation signals using any suitable control scheme that can be configured to output such signals corresponding to the coding scheme shown in FIG. 19 at appropriate times. As another example, the different demodulation signals can be generated by different signal generators. As shown in FIG. 19, the correlation functions generated by the interaction of the modulation function and demodulation functions substantially correspond to the correlation signals generated using an impulse as the modulation function and trapezoid waves that correspond to the desired correlation function as described above in connection with FIG. 11. Note that the correlation function shown in FIG. 19 are normalized, and that the intensity of light indicated by the height of the modulation function is normalized to show an example of relative intensity between schemes (e.g., to show that the relative intensity for K=4 shown in FIG. 19 is one-third of the intensity for K=5 shown in FIG. 20, etc.), but any suitable intensity of light can be used.

FIG. 20 shows an example of modulation functions, demodulation functions, and correlation functions that can be used for a Hamiltonian coding scheme using five measurements to estimate depth in accordance with some embodiments of the disclosed subject matter. As shown in FIG. 20, a set of five correlation functions that correspond to a Hamiltonian coding scheme with K=5 can be generated by an interaction between a square wave modulation function and five square wave demodulation functions. As shown in FIG. 20, the modulation signal can be a square wave that is "high" at the beginning of each integration period $\tau$, and the demodulation signals can be applied to the image sensor (e.g., image sensor 104). In some embodiments, the period between the square wave modulation functions can be $\tau$ plus a time for reading out image data from the image sensor (e.g., as described above in connection with FIG. 2). Additionally, in some embodiments, a duty cycle of the modulation function can be $1/30$ of the integration period $\tau$. As illustrated, each of the demodulation functions has a different profile within time period $\tau$, but a similar combined duty cycle of about 50% (e.g., $15/30$, $8/30+8/30$, $4/30+4/30+3/30+4/30$, and $1/30+2/30+\ldots+2/30$). As shown two of the demodulation functions can include one continuous square wave, each having a duty cycle of 50%. A third demodulation signal can include two square waves within integration period $\tau$, each having a duty cycle of $8/30$ of integration period $\tau$. A fourth demodulation signal can include four square waves within integration period $\tau$, having duty cycles of $4/30$, $4/30$, $3/30$, and $4/30$, respectively. A fifth demodulation signal can include eight square waves within integration period $\tau$, with the first having a duty cycle of $1/30$, and the remaining seven having duty cycles of $2/30$. In some embodiments, the modulation function and demodulation functions can be generated by a single signal generator operating in several different channels, or from any suitable number of signal generators. For example, the demodulation signals can be generated by a signal generator controlled to emit various modulation and/or demodulation signals using any suitable control scheme that can be configured to output such signals corresponding to the coding scheme shown in FIG. 20 at appropriate times. As another example, the different demodulation signals can be generated by different signal generators. Note that the correlation function shown in FIG. 20 are normalized to show an example of relative intensity between schemes (e.g., to show that the relative intensity for K=5 shown in FIG. 20 is three times the intensity for K=4 shown in FIG. 19, and six times the intensity for K=3 shown in FIG. 18, etc.), but any suitable intensity of light can be used.

In some embodiments, a light source (e.g., light source 102) used to generate the modulation functions shown in FIGS. 18-20 can be any suitable light source that can be driven to generate modulated light. For example, as described above in connection with light source 102 of FIG. 1. Additionally, in some embodiments, the lower intensity required by generating a signal modulated as a square function rather than an impulse function can permit use of lower cost and/or less powerful light sources. Note that although demodulation signals are generally shown in a particular order in FIGS. 18-20 (and elsewhere), these are merely examples of an order in which the demodulation signals can be applied. In some embodiments, the demodulation signals can be applied in any order that can be used to generate a depth value. Additionally, in some embodiments, demodulation signals can be applied to an image sensor in any suitable combinations, such as by applying two demodulation signals to two groups of pixels (e.g., every other pixel, every other row, every other column, etc.) in a first integration period, and two different demodulation signals to the two groups of pixels in a second integration period to generate two different pixel values for the first group of pixels and two different pixel values for the second group of pixels that can be used to generate depth values based on the correlation functions shown in FIG. 19.

Although multiple techniques for generating Hamiltonian correlation functions are disclosed herein (e.g., an impulse modulation function and trapezoidal demodulation functions, and a square wave modulation function and square wave demodulation functions), these are merely examples, and other combinations of modulation functions and demodulation functions can be used to generate Hamiltonian correlation functions. Additionally, although a single modulation function is shown being emitted at various times, this is merely an example, and configurations that use multiple different modulation signals can be used to generate Hamiltonian correlation functions. Further, there are many combinations of correlation functions that corresponding to a Hamiltonian coding curve of a particular dimension. More particularly, given a dimension K, there are several different ways to generate the Hamiltonian correlation functions. For example, FIGS. 11 and 20 show different ways of coding Hamiltonian correlation functions for K=5. Then, for each set of Hamiltonian correlation functions, there can be multiple ways to implement them (e.g., using impulse modulation as described above in connection with, for example, FIGS. 2 and 3, using square modulation as described above in connection with FIGS. 18-20).

In general, for systems with limited bandwidth signal generators and/or low peak power light sources, the codes described herein may require low-pass filtering and clamping, thereby resulting in lower performance.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 4 and 5 can be executed or performed in any order or sequence not limited to the order and sequence shown and described in the figures. Also, some of the above steps of the processes of FIGS. 4 and 5 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for estimating the depth of a scene, the system comprising:
    a light source;
    an image sensor comprising at least one pixel;
    a signal generator configured to output at least:
        a first signal corresponding to a modulation function, wherein the modulation function comprises a square wave; and
        a second signal corresponding to a first demodulation function of K demodulation functions; and
    at least one hardware processor that is programmed to:
        cause the light source to emit first modulated light toward the scene with modulation based on the first signal;
        cause the image sensor to generate a first value based on the first modulated light received from a portion of the scene and the second signal;
        cause the image sensor to generate a second value based on second modulated light received from the portion of the scene, and a third signal corresponding to a second demodulation function of the K demodulation functions;
        cause the image sensor to generate a third value based on third modulated light received from the portion of the scene and a fourth signal corresponding to a third demodulation function of the K demodulation functions; and
        determine a depth estimate for the portion of the scene based on the first value, the second value, the third value, and at least three correlation functions each including at least one half of a trapezoid wave.

2. The system of claim 1, wherein K is at least four.

3. The system of claim 1, wherein the at least one hardware processor is further programmed to cause the light source to emit the first modulated light during a first time period, the second modulated light during a second time period, and the third modulated light during a third time period, wherein the first value is based on the modulated light emitted during the first time period, the second value is based on the modulated light emitted during the second time period, and the third value is based on the modulated light emitted during the third time period.

4. The system of claim 3, wherein the at least one hardware processor is further programmed to cause the light source to emit the first modulated light after the second time period has elapsed.

5. The system of claim 1, wherein the modulation function has a duty cycle of one sixth of an integration period $\tau$.

6. The system of claim 1, wherein each of the K demodulation functions includes at least one square wave, and the K demodulation functions correspond to K correlation functions that each include at least one half of a trapezoid wave.

7. The system of claim 1, wherein the signal generator comprises multiple signal generators.

8. A method for estimating the depth of a scene, the method comprising:
    causing a light source to emit first modulated light toward the scene with modulation based on a first signal output by a signal generator, wherein the first signal corresponds to a modulation function comprising a square wave;
    causing an image sensor to generate a first value based on the first modulated light received from a portion of the scene and a second signal output by the signal generator, wherein the second signal corresponds to a first demodulation function of K demodulation functions;
    causing the image sensor to generate a second value based on second modulated light received from the portion of the scene and a third signal corresponding to a second demodulation function of the K demodulation functions;
    causing the image sensor to generate a third value based on the third modulated light received from the portion of the scene and a fourth signal corresponding to a third demodulation function of the K demodulation functions; and
    determining a depth estimate for the portion of the scene based on the first value, the second value, the third value, and at least three correlation functions each including at least one half of a trapezoid wave.

9. The method of claim 8, wherein K is at least four.

10. The method of claim 8, wherein causing a light source to emit modulated light toward the scene comprises:
    causing the light source to emit the first modulated light during a first time period;
    causing the light source to emit the second modulated light during a second time period; and
    causing the light source to emit the third modulated light during a third time period, wherein the first value is based on the modulated light emitted during the first time period, the second value is based on the modulated light emitted during the second time period, and the third value is based on the modulated light emitted during the third time period.

11. The method of claim 10, further comprising causing the light source to emit the first modulated light after the second time period has elapsed.

12. The method of claim 9, wherein the modulation function has a duty cycle of one sixth of an integration period $\tau$.

13. The method of claim 9, wherein each of the K demodulation functions includes at least one square wave, and the K demodulation functions correspond to K correlation functions that each include at least one half of a trapezoid wave.

14. The method of claim 8, wherein signal generator comprises multiple signal generators.

15. A non-transitory computer readable medium containing computer executable instructions that, when executed by a processor, cause the processor to perform a method for estimating the depth of a scene, the method comprising:
  causing a light source to emit first modulated light toward the scene with modulation based on a first signal output by a signal generator, wherein the first signal corresponds to a modulation function comprising a square wave;
  causing an image sensor to generate a first value based on the modulated light received from a portion of the scene and a second signal output by the signal generator, wherein the second signal corresponds to a first demodulation function of K demodulation functions;
  causing the image sensor to generate a second value based on second modulated light received from the portion of the scene and a third signal corresponding to a second demodulation function of the K demodulation functions;
  causing the image sensor to generate a third value based on third modulated light received from the portion of the scene and a fourth signal corresponding to a third demodulation function of the K demodulation functions; and
  determining a depth estimate for the portion of the scene based on the first value, the second value, the third value, and at least three correlation functions each including at least one half of a trapezoid wave.

16. The non-transitory computer readable medium of claim 15, wherein K is at least four.

17. The non-transitory computer readable medium of claim 15, wherein causing a light source to emit modulated light toward the scene comprises:
  causing the light source to emit the modulated light during a first time period;
  causing the light source to emit the modulated light during a second time period; and
  causing the light source to emit the first modulated light during a third time period, wherein the first value is based on the second modulated light emitted during the first time period, the second value is based on the third modulated light emitted during the second time period, and the third value is based on the modulated light emitted during the third time period.

18. The non-transitory computer readable medium of claim 17, wherein the method further comprises causing the light source to emit the first modulated light after the second time period has elapsed.

19. The non-transitory computer readable medium of claim 15, wherein the modulation function has a duty cycle of one sixth of an integration period $\tau$.

20. The non-transitory computer readable medium of claim 15, wherein each of the K demodulation functions includes at least one square wave, and the K demodulation functions correspond to K correlation functions that each include at least one half of a trapezoid wave.

21. The non-transitory computer readable medium of claim 15, wherein the signal generator comprises multiple signal generators.

* * * * *